US011334319B2

(12) United States Patent
Madduri et al.

(10) Patent No.: US 11,334,319 B2
(45) Date of Patent: May 17, 2022

(54) APPARATUS AND METHOD FOR MULTIPLICATION AND ACCUMULATION OF COMPLEX VALUES

(71) Applicant: Intel Corporation, Santa Clara, CA (US)

(72) Inventors: Venkateswara Rao Madduri, Austin, TX (US); Elmoustapha Ould-Ahmed-Vall, Chandler, AZ (US); Robert Valentine, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/617,916

(22) PCT Filed: Jun. 30, 2017

(86) PCT No.: PCT/US2017/040330
§ 371 (c)(1),
(2) Date: Nov. 27, 2019

(87) PCT Pub. No.: WO2019/005115
PCT Pub. Date: Jan. 3, 2019

(65) Prior Publication Data
US 2020/0110581 A1  Apr. 9, 2020

(51) Int. Cl.
*G06F 7/523* (2006.01)
*G06F 9/30* (2018.01)

(52) U.S. Cl.
CPC ............ *G06F 7/523* (2013.01); *G06F 9/3001* (2013.01)

(58) Field of Classification Search
CPC ..... G06F 9/30036; G06F 9/3885–3887; G06F 9/3893; G06F 15/80–8007; G06F 15/8053; G06F 15/8076
See application file for complete search history.

(56) References Cited

U.S. PATENT DOCUMENTS

| 5,862,067 A | 1/1999 | Mennemeier et al. |
| 5,936,872 A | 8/1999 | Fischer et al. |

(Continued)

FOREIGN PATENT DOCUMENTS

| DE | 102018129298 A1 | 6/2019 |
| WO | 02/69081 A2 | 9/2002 |
| WO | 2005/013084 A2 | 2/2005 |

OTHER PUBLICATIONS

International Preliminary Report on Patentability, PCT App. No. PCT/US2017/040330, dated Jan. 9, 2020, 9 pages.

(Continued)

*Primary Examiner* — Matthew D Sandifer
(74) *Attorney, Agent, or Firm* — Nicholson De Vos Webster & Elliott LLP

(57) ABSTRACT

An apparatus and method for multiplying packed unsigned words. For example, one embodiment of a processor comprises: a decoder to decode a first instruction to generate a decoded instruction; a first source register to store a first plurality of packed unsigned words; a second source register to store a second plurality of packed unsigned words; execution circuitry to execute the decoded instruction, the execution circuitry comprising: multiplier circuitry to multiply each of a plurality of packed unsigned words from the first source register with corresponding packed unsigned words from the second source register to generate a plurality of products responsive to the decoded instruction, adder circuitry to add the products to generate a first result, and accumulation circuitry to combine the first result with an accumulated result to generate a final result comprising a third plurality of packed unsigned words, and to write the third plurality of packed unsigned words or a maximum value to a destination register.

22 Claims, 19 Drawing Sheets

(56) References Cited

U.S. PATENT DOCUMENTS

| | | |
|---|---|---|
| 6,324,638 B1 | 11/2001 | Elmer et al. |
| 7,043,518 B2 | 5/2006 | Simon et al. |
| 7,392,368 B2 | 6/2008 | Khan et al. |
| 7,487,196 B1 | 2/2009 | Metzgen |
| 7,546,330 B2 | 6/2009 | Taunton |
| 7,716,269 B2 | 5/2010 | Simon et al. |
| 7,873,812 B1 | 1/2011 | Mimar |
| 8,131,981 B2 | 3/2012 | Paver et al. |
| 9,477,441 B2 | 10/2016 | Samudrala et al. |
| 10,552,154 B2 | 2/2020 | Madduri et al. |
| 10,664,270 B2 | 5/2020 | Ould-Ahmed-Vall et al. |
| 2001/0032228 A1 | 10/2001 | Fischer et al. |
| 2002/0169813 A1 | 11/2002 | Pechanek et al. |
| 2003/0014458 A1 | 1/2003 | Fischer et al. |
| 2004/0034760 A1 | 2/2004 | Paver et al. |
| 2004/0117422 A1 | 6/2004 | Debes et al. |
| 2004/0167954 A1 | 8/2004 | Griessing |
| 2005/0027773 A1 | 2/2005 | Machnicki et al. |
| 2005/0071413 A1* | 3/2005 | Schulte .............. G06F 9/3893 708/523 |
| 2005/0235026 A1 | 10/2005 | Simon et al. |
| 2006/0179273 A1 | 8/2006 | Cole et al. |
| 2006/0277245 A1 | 12/2006 | Kurd |
| 2007/0239968 A1* | 10/2007 | Moyer .............. G06F 9/30101 712/221 |
| 2009/0077345 A1* | 3/2009 | Moyer .............. G06F 9/30036 712/4 |
| 2012/0166511 A1 | 6/2012 | Hiremath et al. |
| 2013/0026254 A1 | 1/2013 | Sesser et al. |
| 2013/0262547 A1* | 10/2013 | Peleg .............. G06F 17/16 708/501 |
| 2013/0275731 A1 | 10/2013 | Sair et al. |
| 2014/0365548 A1 | 12/2014 | Mortensen |
| 2016/0378716 A1 | 12/2016 | Grochowski et al. |
| 2019/0102198 A1 | 4/2019 | Madduri et al. |
| 2019/0196827 A1 | 6/2019 | Madduri et al. |
| 2019/0196828 A1 | 6/2019 | Madduri et al. |
| 2019/0196829 A1 | 6/2019 | Ould-Ahmed-Vall et al. |
| 2019/0227797 A1 | 7/2019 | Heinecke et al. |

OTHER PUBLICATIONS

International Preliminary Report on Patentability, PCT App. No. PCT/US2017/040408, dated Jan. 9, 2020, 10 pages.
International Preliminary Report on Patentability, PCT App. No. PCT/US2017/040416, dated Jan. 9, 2020, 11 pages.
International Search Report and Written Opinion received for PCT Patent Application No. PCT/US2017/040408, dated Mar. 26, 2018, 15 pages.
International Search Report and Written Opinion received for PCT Patent Application No. PCT/US2017/040416, dated Mar. 9, 2018, 16 pages.
PCT Notification of Transmittal of the International Search Report and the Written Opinion of the International Searching Authority, or the Declaration from PCT/US2017/040330, dated Feb. 20, 2018, 15 pages.
'Integer Multiplication with Overflow Detection or Saturation' by Mustafa Gok, Lehigh University, 2000. (Year: 2000).
Final Office Action, U.S. Appl. No. 16/617,890, dated Mar. 16, 2021, 13 pages.
Non-Final Office Action received for U.S. Appl. No. 16/617,890, dated Jun. 28, 2021, 17 pages.
Non-Final Office Action, U.S. Appl. No. 16/617,890, dated Oct. 5, 2020, 20 pages.
Notice of Allowance, U.S. Appl. No. 16/617,890, dated Dec. 3, 2021, 9 pages.
Non-Final Office Action, U.S. Appl. No. 16/617,948, dated Feb. 25, 2022, 40 pages.
Notice of Allowance, U.S. Appl. No. 16/617,890, dated Mar. 8, 2022, 5 pages.

* cited by examiner

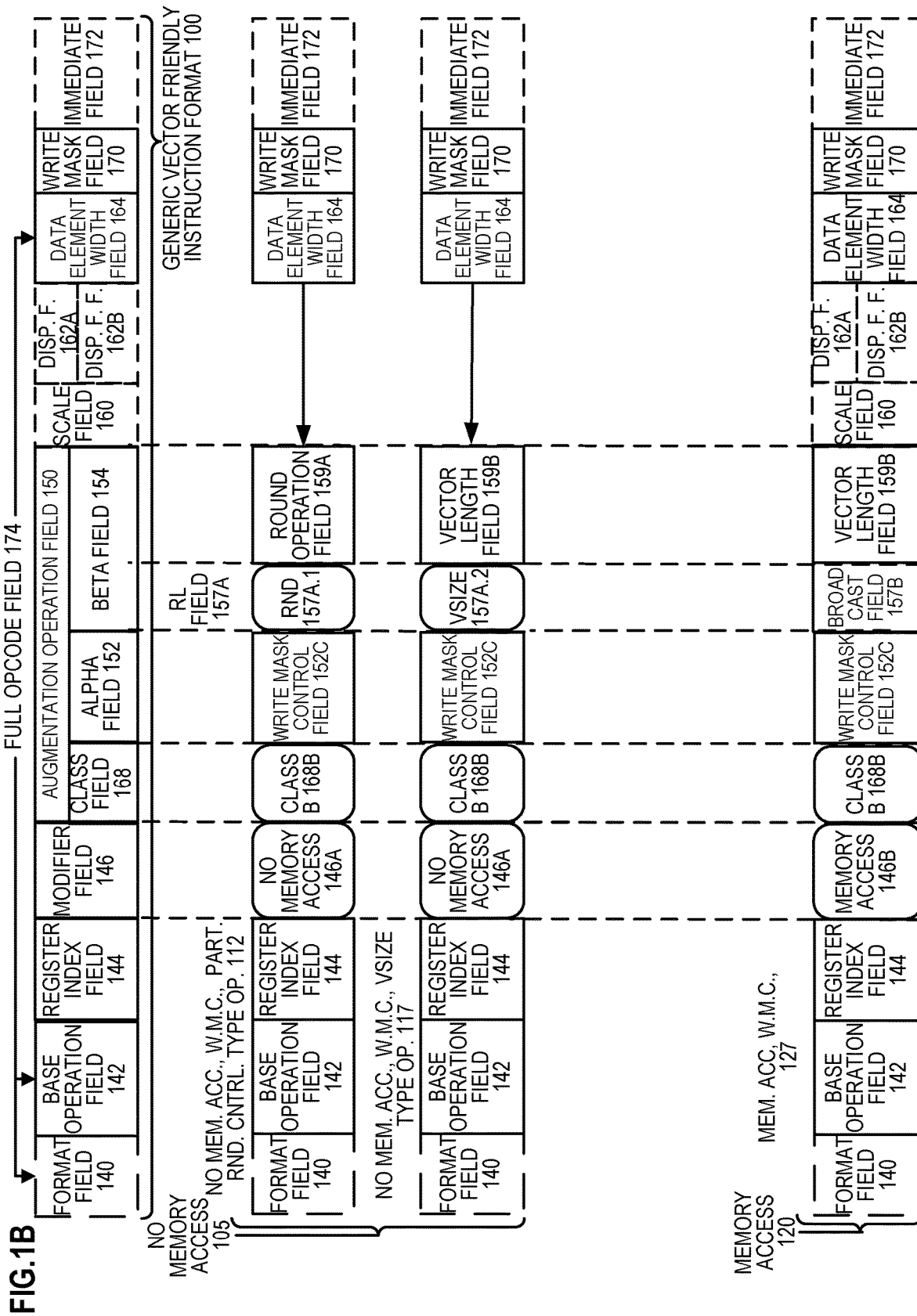

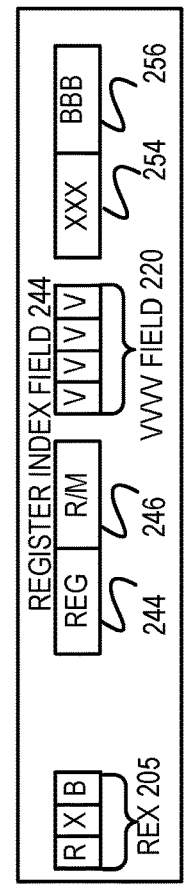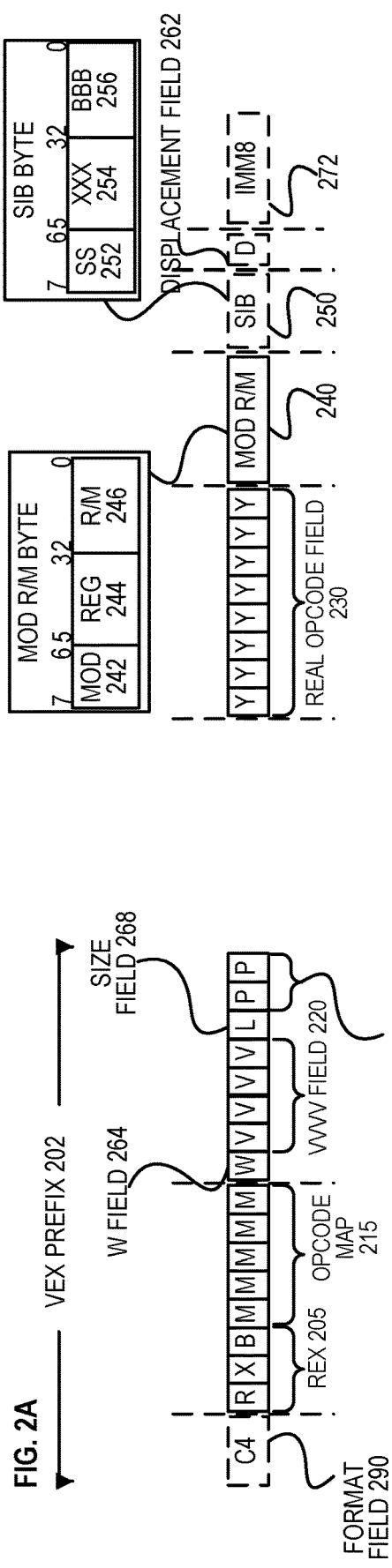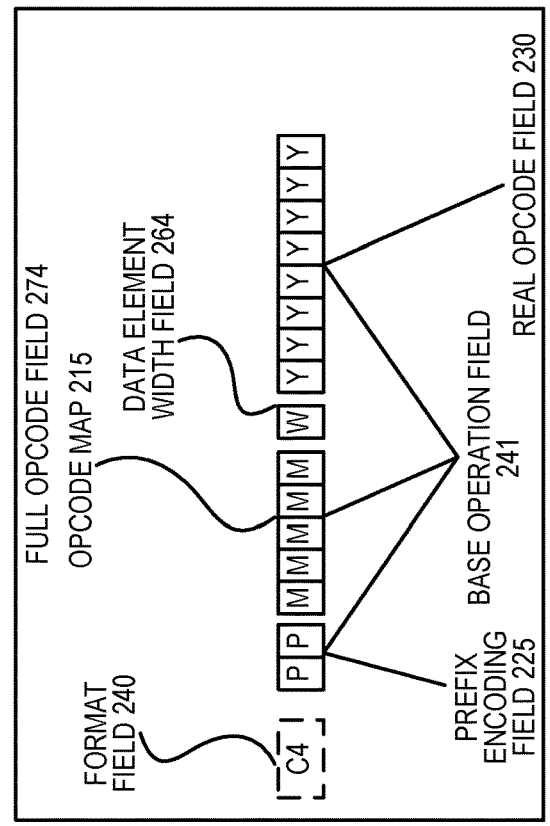
FIG. 2A
FIG. 2B
FIG. 2C

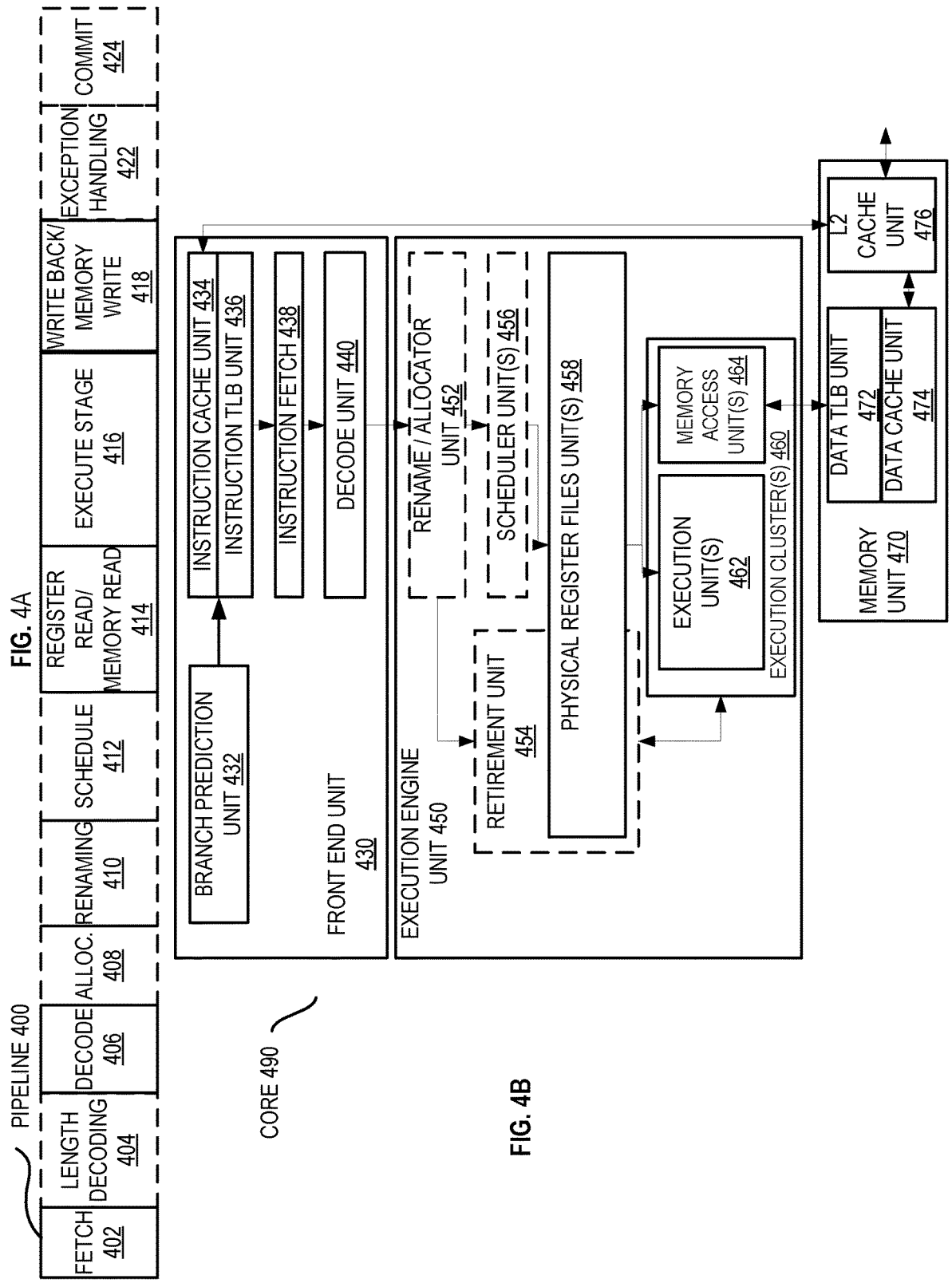

APPARATUS AND METHOD FOR MULTIPLICATION AND ACCUMULATION OF COMPLEX VALUES

CROSS-REFERENCE TO RELATED APPLICATION

This patent application is a U.S. National Phase Application under 35 U.S.C. § 371 of International Application No. PCT/US2017/040330, filed Jun. 30, 2017, entitled APPARATUS AND METHOD FOR MULTIPLICATION AND ACCUMULATION OF COMPLEX VALUES.

BACKGROUND

Field of the Invention

The embodiments of the invention relate generally to the field of computer processors. More particularly, the embodiments relate to an apparatus and method for multiplication and accumulation of complex values.

Description of the Related Art

1. Processor Microarchitectures

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term "instruction" generally refers herein to macro-instructions—that is instructions that are provided to the processor for execution—as opposed to micro-instructions or micro-ops—that is the result of a processor's decoder decoding macro-instructions. The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file). Unless otherwise specified, the phrases register architecture, register file, and register are used herein to refer to that which is visible to the software/programmer and the manner in which instructions specify registers. Where a distinction is required, the adjective "logical," "architectural," or "software visible" will be used to indicate registers/files in the register architecture, while different adjectives will be used to designate registers in a given microarchitecture (e.g., physical register, reorder buffer, retirement register, register pool).

Multiply-accumulate is a common digital signal processing operation which computes the product of two numbers and adds that product to an accumulated value. Existing single instruction multiple data (SIMD) microarchitectures implement multiply-accumulate operations by executing a sequence of instructions. For example, a multiply-accumulate may be performed with a multiply instruction, followed by a 4-way addition, and then an accumulation with the destination quadword data to generate two 64-bit saturated results. It would be beneficial to implement a multiply-accumulate operation more efficiently with fewer instructions.

BRIEF DESCRIPTION OF THE DRAWINGS

A better understanding of the present invention can be obtained from the following detailed description in conjunction with the following drawings, in which:

FIGS. 1A and 1B are block diagrams illustrating a generic vector friendly instruction format and instruction templates thereof according to embodiments of the invention;

FIGS. 2A-C are block diagrams illustrating an exemplary VEX instruction format according to embodiments of the invention;

FIG. 4A is a block diagram illustrating both an exemplary in-order fetch, decode, retire pipeline and an exemplary register renaming, out-of-order issue/execution pipeline according to embodiments of the invention;

FIG. 4B is a block diagram illustrating both an exemplary embodiment of an in-order fetch, decode, retire core and an exemplary register renaming, out-of-order issue/execution architecture core to be included in a processor according to embodiments of the invention;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures, Instruction Formats, and Data Types

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 1A:
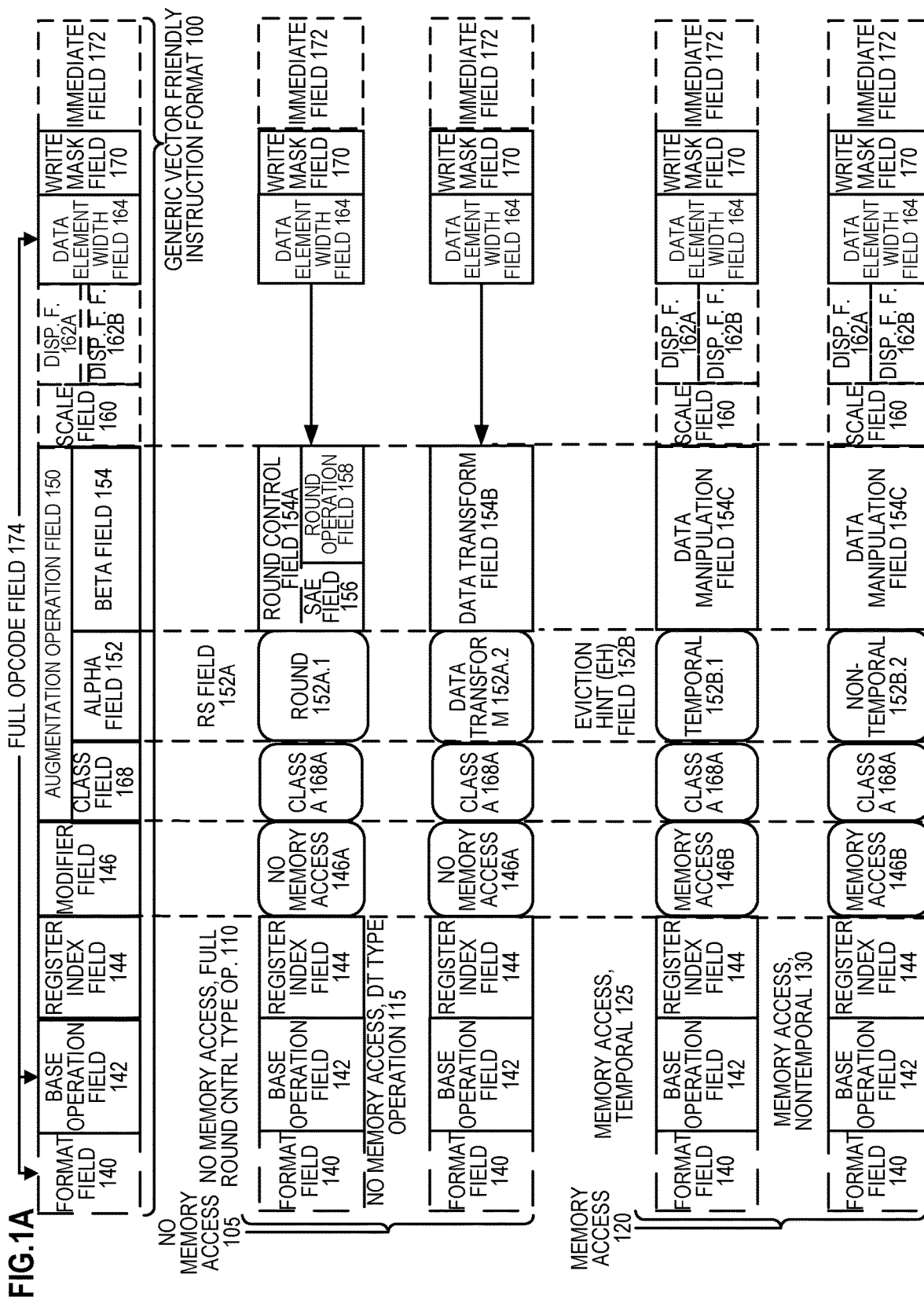

FIGS. 1A-1B are block diagrams illustrating a generic vector friendly instruction format and instruction templates thereof according to embodiments of the invention. FIG. 1A is a block diagram illustrating a generic vector friendly instruction format and class A instruction templates thereof according to embodiments of the invention; while FIG. 1B is a block diagram illustrating the generic vector friendly instruction format and class B instruction templates thereof according to embodiments of the invention. Specifically, a generic vector friendly instruction format 100 for which are defined class A and class B instruction templates, both of which include no memory access 105 instruction templates and memory access 120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 1A include: 1) within the no memory access 105 instruction templates there is shown a no memory access, full round control type operation 110 instruction template and a no memory access, data transform type operation 115 instruction template; and 2) within the memory access 120 instruction templates there is shown a memory access, temporal 125 instruction template and a memory access, non-temporal 130 instruction template. The class B instruction templates in FIG. 1B include: 1) within the no memory access 105 instruction templates there is shown a no memory access, write mask control, partial round control type operation 112 instruction template and a no memory access, write mask control, vsize type operation 117 instruction template; and 2) within the memory access 120 instruction templates there is shown a memory access, write mask control 127 instruction template.

The generic vector friendly instruction format 100 includes the following fields listed below in the order illustrated in FIGS. 1A-1B.

Format field 140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 142—its content distinguishes different base operations.

Register index field 144—its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 146—its content distinguishes occurrences of instructions in the generic vector instruction format that specify memory access from those that do not; that is, between no memory access 105 instruction templates and memory access 120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 150—its content distinguishes which one of a variety of different operations to be performed in addition to the base operation. This field is context specific. In one embodiment of the invention, this field is divided into a class field 168, an alpha field 152, and a beta field 154. The augmentation operation field 150 allows common groups of operations to be performed in a single instruction rather than 2, 3, or 4 instructions.

Scale field 160—its content allows for the scaling of the index field's content for memory address generation (e.g., for address generation that uses $2^{scale}*\text{index}+\text{base}$).

Displacement Field 162A—its content is used as part of memory address generation (e.g., for address generation that uses $2^{scale}*\text{index}+\text{base}+\text{displacement}$).

Displacement Factor Field 162B (note that the juxtaposition of displacement field 162A directly over displacement factor field 162B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 174 (described later herein) and the data manipulation field 154C. The displacement field 162A and the displacement factor field 162B are optional in the sense that they are not used for the no memory access 105 instruction templates and/or different embodiments may implement only one or none of the two.

Data element width field 164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 170 allows for partial vector operations, including loads, stores, arithmetic, logical, etc. While embodiments of the invention are described in which the write mask field's 170 content selects one of a number of write mask registers that contains the write mask to be used (and thus the write mask field's 170 content indirectly identifies that masking to be performed), alternative embodiments instead or additional allow the mask write field's 170 content to directly specify the masking to be performed.

Immediate field 172—its content allows for the specification of an immediate. This field is optional in the sense that is it not present in an implementation of the generic vector friendly format that does not support immediate and it is not present in instructions that do not use an immediate.

Class field 168—its content distinguishes between different classes of instructions. With reference to FIGS. 1A-B, the contents of this field select between class A and class B instructions. In FIGS. 1A-B, rounded corner squares are used to indicate a specific value is present in a field (e.g., class A 168A and class B 168B for the class field 168 respectively in FIGS. 1A-B).

Instruction Templates of Class A

In the case of the non-memory access 105 instruction templates of class A, the alpha field 152 is interpreted as an R S field 152A, whose content distinguishes which one of the different augmentation operation types are to be performed (e.g., round 152A.1 and data transform 152A.2 are respectively specified for the no memory access, round type operation 110 and the no memory access, data transform type operation 115 instruction templates), while the beta field 154 distinguishes which of the operations of the specified type is to be performed. In the no memory access 105 instruction templates, the scale field 160, the displacement field 162A, and the displacement scale filed 162B are not present.

No-Memory Access Instruction Templates—Full Round Control Type Operation

In the no memory access full round control type operation 110 instruction template, the beta field 154 is interpreted as a round control field 154A, whose content(s) provide static rounding. While in the described embodiments of the invention the round control field 154A includes a suppress all floating point exceptions (SAE) field 156 and a round operation control field 158, alternative embodiments may support may encode both these concepts into the same field or only have one or the other of these concepts/fields (e.g., may have only the round operation control field 158).

SAE field 156—its content distinguishes whether or not to disable the exception event reporting; when the SAE field's 156 content indicates suppression is enabled, a given instruction does not report any kind of floating-point exception flag and does not raise any floating point exception handler.

Round operation control field 158—its content distinguishes which one of a group of rounding operations to perform (e.g., Round-up, Round-down, Round-towards-zero and Round-to-nearest). Thus, the round operation control field 158 allows for the changing of the rounding mode on a per instruction basis. In one embodiment of the invention where a processor includes a control register for specifying rounding modes, the round operation control field's 150 content overrides that register value.

No Memory Access Instruction Templates—Data Transform Type Operation

In the no memory access data transform type operation 115 instruction template, the beta field 154 is interpreted as a data transform field 154B, whose content distinguishes which one of a number of data transforms is to be performed (e.g., no data transform, swizzle, broadcast).

In the case of a memory access 120 instruction template of class A, the alpha field 152 is interpreted as an eviction hint field 152B, whose content distinguishes which one of the eviction hints is to be used (in FIG. 1A, temporal 152B.1 and non-temporal 152B.2 are respectively specified for the memory access, temporal 125 instruction template and the memory access, non-temporal 130 instruction template), while the beta field 154 is interpreted as a data manipulation field 154C, whose content distinguishes which one of a number of data manipulation operations (also known as primitives) is to be performed (e.g., no manipulation; broadcast; up conversion of a source; and down conversion of a destination). The memory access 120 instruction templates include the scale field 160, and optionally the displacement field 162A or the displacement scale field 162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 152 is interpreted as a write mask control (Z) field 152C, whose content distinguishes whether the write masking controlled by the write mask field 170 should be a merging or a zeroing.

In the case of the non-memory access 105 instruction templates of class B, part of the beta field 154 is interpreted as an R L field 157A, whose content distinguishes which one of the different augmentation operation types are to be performed (e.g., round 157A.1 and vector length (VSIZE) 157A.2 are respectively specified for the no memory access, write mask control, partial round control type operation 112 instruction template and the no memory access, write mask control, VSIZE type operation 117 instruction template), while the rest of the beta field 154 distinguishes which of the operations of the specified type is to be performed. In the no memory access 105 instruction templates, the scale field 160, the displacement field 162A, and the displacement scale filed 162B are not present.

In the no memory access, write mask control, partial round control type operation 110 instruction template, the rest of the beta field 154 is interpreted as a round operation field 159A and exception event reporting is disabled (a given instruction does not report any kind of floating-point exception flag and does not raise any floating point exception handler).

Round operation control field 159A—just as round operation control field 158, its content distinguishes which one of a group of rounding operations to perform (e.g., Round-up, Round-down, Round-towards-zero and Round-to-nearest). Thus, the round operation control field 159A allows for the changing of the rounding mode on a per instruction basis. In one embodiment of the invention where a processor includes a control register for specifying rounding modes, the round operation control field's 150 content overrides that register value.

In the no memory access, write mask control, VSIZE type operation 117 instruction template, the rest of the beta field 154 is interpreted as a vector length field 159B, whose content distinguishes which one of a number of data vector lengths is to be performed on (e.g., 128, 256, or 512 byte).

In the case of a memory access 120 instruction template of class B, part of the beta field 154 is interpreted as a broadcast field 157B, whose content distinguishes whether or not the broadcast type data manipulation operation is to be performed, while the rest of the beta field 154 is interpreted the vector length field 159B. The memory access 120 instruction templates include the scale field 160, and optionally the displacement field 162A or the displacement scale field 162B.

With regard to the generic vector friendly instruction format 100, a full opcode field 174 is shown including the format field 140, the base operation field 142, and the data element width field 164. While one embodiment is shown where the full opcode field 174 includes all of these fields, the full opcode field 174 includes less than all of these fields in embodiments that do not support all of them. The full opcode field 174 provides the operation code (opcode).

The augmentation operation field 150, the data element width field 164, and the write mask field 170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

VEX Instruction Format

VEX encoding allows instructions to have more than two operands, and allows SIMD vector registers to be longer than 28 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 2A illustrates an exemplary AVX instruction format including a VEX prefix 202, real opcode field 230, Mod R/M byte 240, SIB byte 250, displacement field 262, and IMM8 272. FIG. 2B illustrates which fields from FIG. 2A make up a full opcode field 274 and a base operation field 241. FIG. 2C illustrates which fields from FIG. 2A make up a register index field 244.

VEX Prefix (Bytes 0-2) 202 is encoded in a three-byte form. The first byte is the Format Field 290 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 205 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit[5]-B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 215 (VEX byte 1, bits [4:0]-mmmmm) includes content to encode an implied leading opcode byte. W Field 264 (VEX byte 2, bit [7]-W)—is represented by the notation VEX.W, and provides different functions depending on the instruction. The role of VEX.vvvv 220 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111 b. If VEX.L 268 Size field (VEX byte 2, bit [2]-L)=0, it indicates 28 bit vector; if VEX.L=1, it indicates 256 bit vector. Prefix encoding field 225 (VEX byte 2, bits [1:0]-pp) provides additional bits for the base operation field 241.

Real Opcode Field 230 (Byte 3) is also known as the opcode byte. Part of the opcode is specified in this field.

MOD R/M Field 240 (Byte 4) includes MOD field 242 (bits [7-6]), Reg field 244 (bits [5-3]), and R/M field 246 (bits [2-0]). The role of Reg field 244 may include the following: encoding either the destination register operand or a source register operand (the rrr of Rrrr), or be treated as an opcode extension and not used to encode any instruction operand. The role of R/M field 246 may include the following: encoding the instruction operand that references a memory address, or encoding either the destination register operand or a source register operand.

Scale, Index, Base (SIB)—The content of Scale field 250 (Byte 5) includes SS252 (bits [7-6]), which is used for memory address generation. The contents of SIB.xxx 254 (bits [5-3]) and SIB.bbb 256 (bits [2-0]) have been previously referred to with regard to the register indexes Xxxx and Bbbb.

The Displacement Field 262 and the immediate field (IMM8) 272 contain data.

Exemplary Register Architecture

Figure 3:
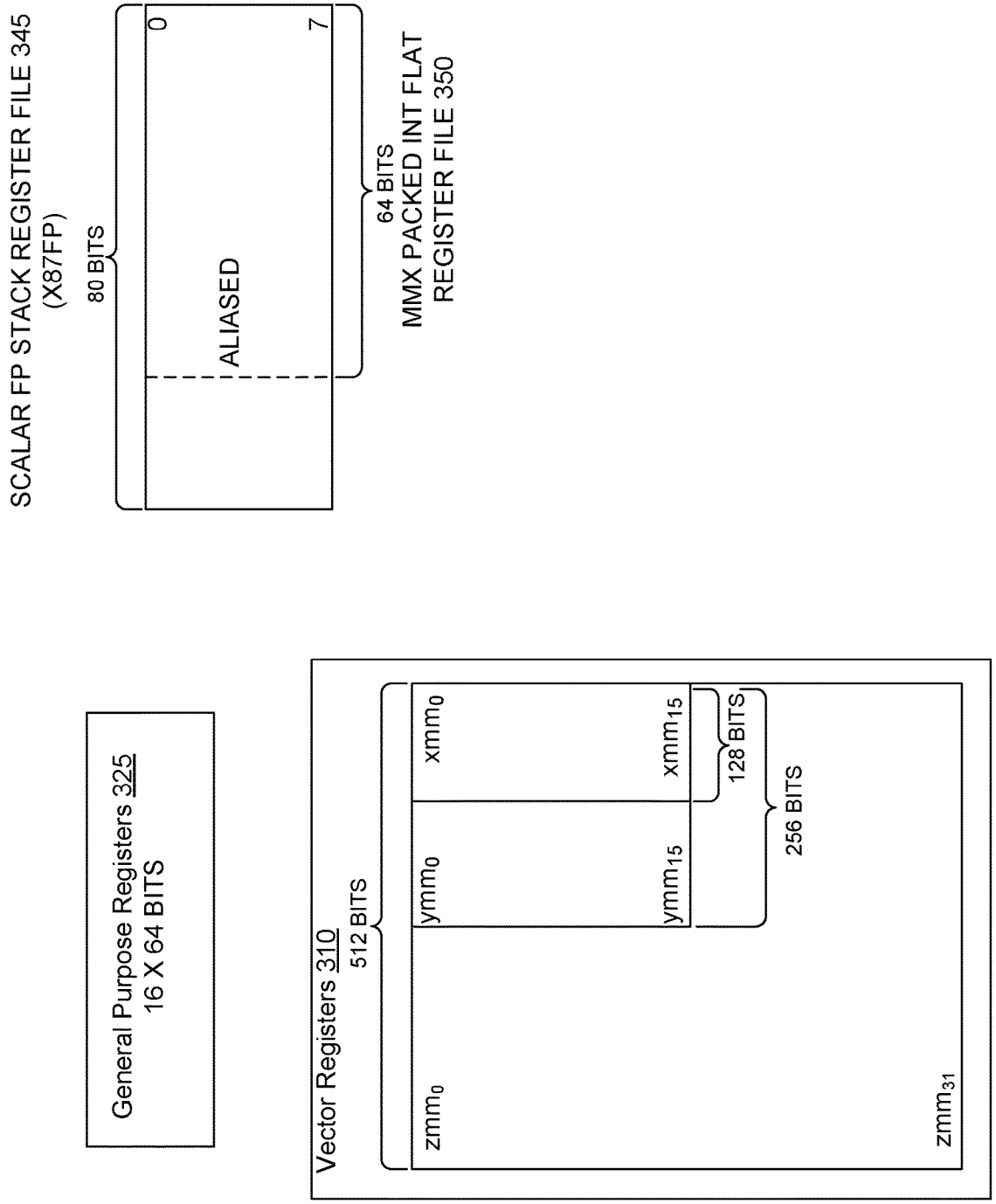
FIG. 3 is a block diagram of a register architecture according to one embodiment of the invention.

FIG. 3 is a block diagram of a register architecture 300 according to one embodiment of the invention. In the embodiment illustrated, there are 32 vector registers 310 that are 512 bits wide; these registers are referenced as zmm0 through zmm31. The lower order 256 bits of the lower 6 zmm registers are overlaid on registers ymm0-15. The lower order 128 bits of the lower 6 zmm registers (the lower order 128 bits of the ymm registers) are overlaid on registers xmm0-15.

General-purpose registers 325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 345, on which is aliased the MMX packed integer flat register file 350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 5B:
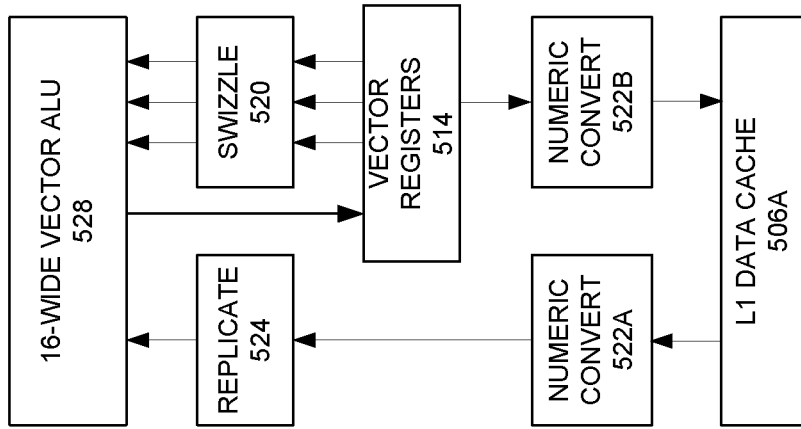
FIG. 5B illustrates an expanded view of part of the processor core in FIG. 5A according to embodiments of the invention.
Figure 5A:
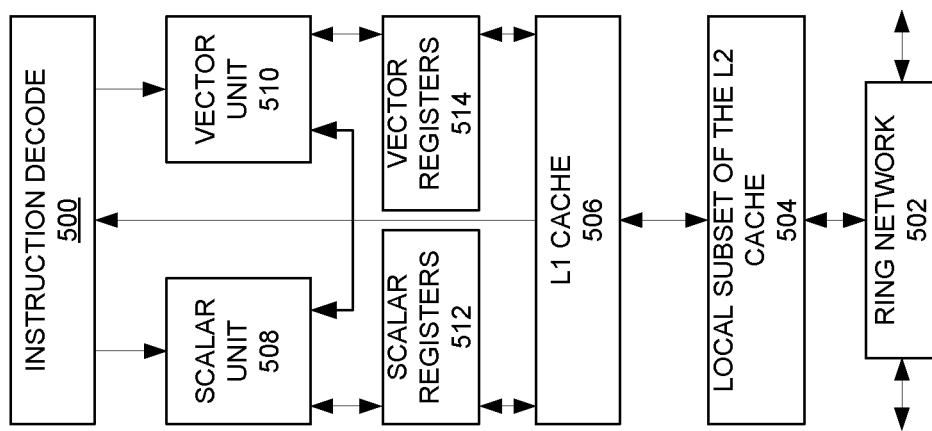
FIG. 5A is a block diagram of a single processor core, along with its connection to an on-die interconnect network.

FIGS. 5A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 5A is a block diagram of a single processor core, along with its connection to the on-die interconnect network 502 and with its local subset of the Level 2 (L2) cache 504, according to embodiments of the invention. In one embodiment, an instruction decoder 500 supports the x86 instruction set with a packed data instruction set extension. An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, alternative embodiments of the invention may use a different approach (e.g., use a single register set or include a communication path that allow data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and can be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 5B is an expanded view of part of the processor core in FIG. 5A according to embodiments of the invention. FIG. 5B includes an L1 data cache 506A part of the L1 cache 504, as well as more detail regarding the vector unit 510 and the vector registers 514. Specifically, the vector unit 510 is a 6-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input.

Processor with Integrated Memory Controller and Graphics

Figure 6:
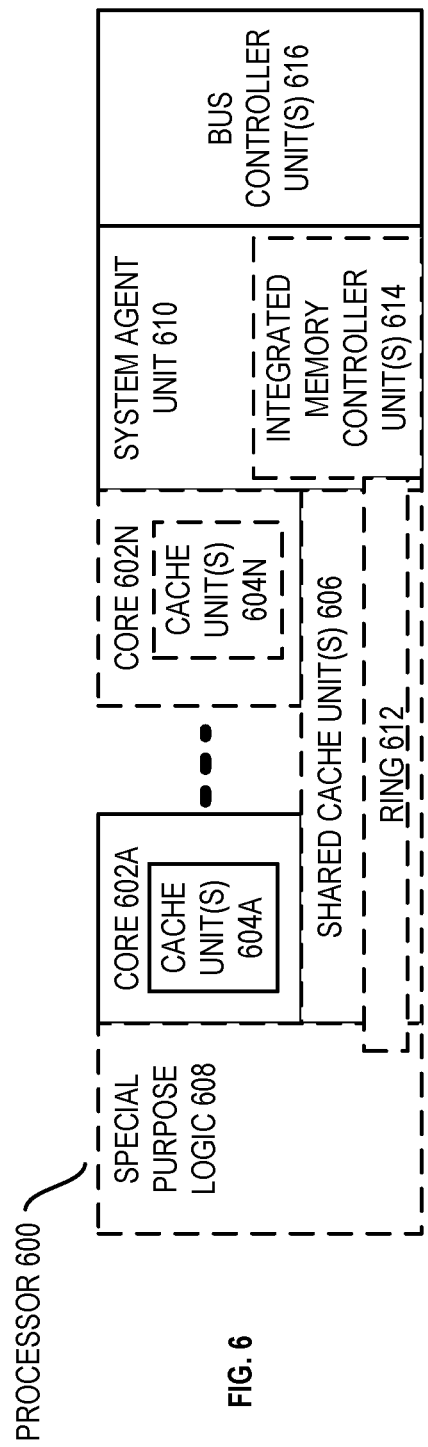
FIG. 6 is a block diagram of a single core processor and a multicore processor with integrated memory controller and graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores 604A-N, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the integrated graphics logic 608, the set of shared cache units 606, and the system agent unit 610/integrated memory controller unit(s)

614, alternative embodiments may use any number of well-known techniques for interconnecting such units. In one embodiment, coherency is maintained between one or more cache units 606 and cores 602-A-N.

In some embodiments, one or more of the cores 602A-N are capable of multi-threading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

Exemplary Computer Architectures

FIGS. 7-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
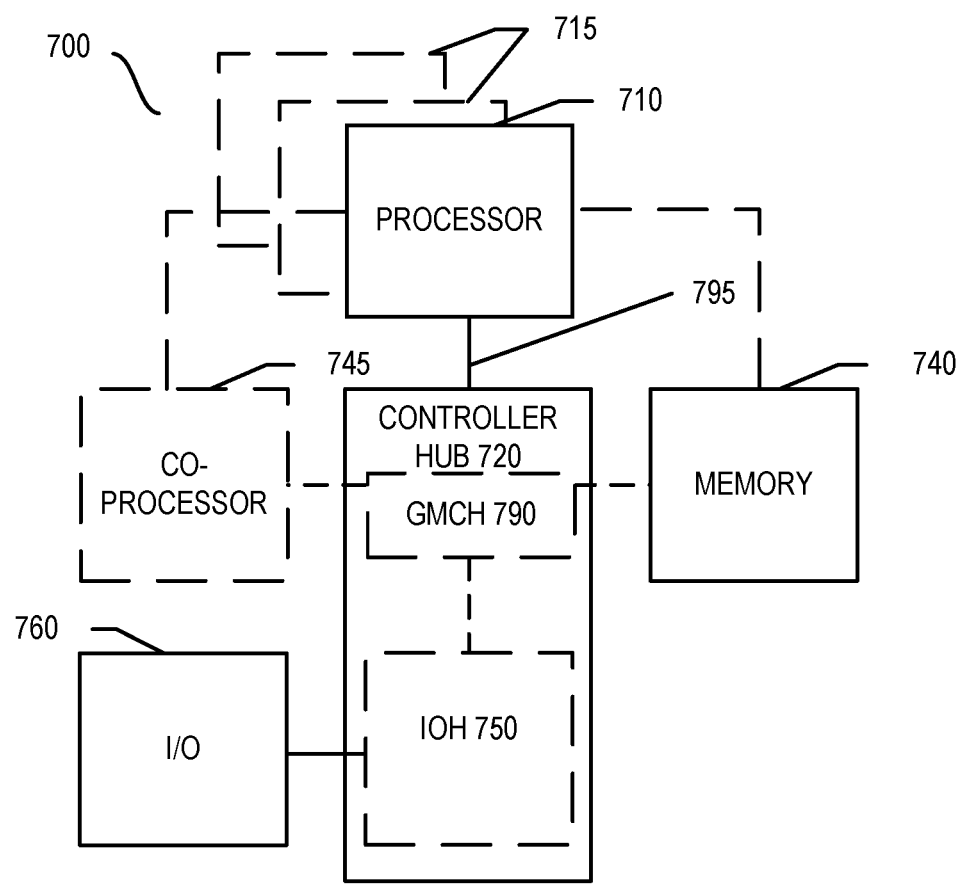
FIG. 7 illustrates a block diagram of a system in accordance with one embodiment of the present invention.

Referring now to FIG. 7, shown is a block diagram of a system 700 in accordance with one embodiment of the present invention. The system 700 may include one or more processors 710, 715, which are coupled to a controller hub 720. In one embodiment, the controller hub 720 includes a graphics memory controller hub (GMCH) 790 and an Input/Output Hub (IOH) 750 (which may be on separate chips); the GMCH 790 includes memory and graphics controllers to which are coupled memory 740 and a coprocessor 745; the IOH 750 is couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface, or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 7155 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
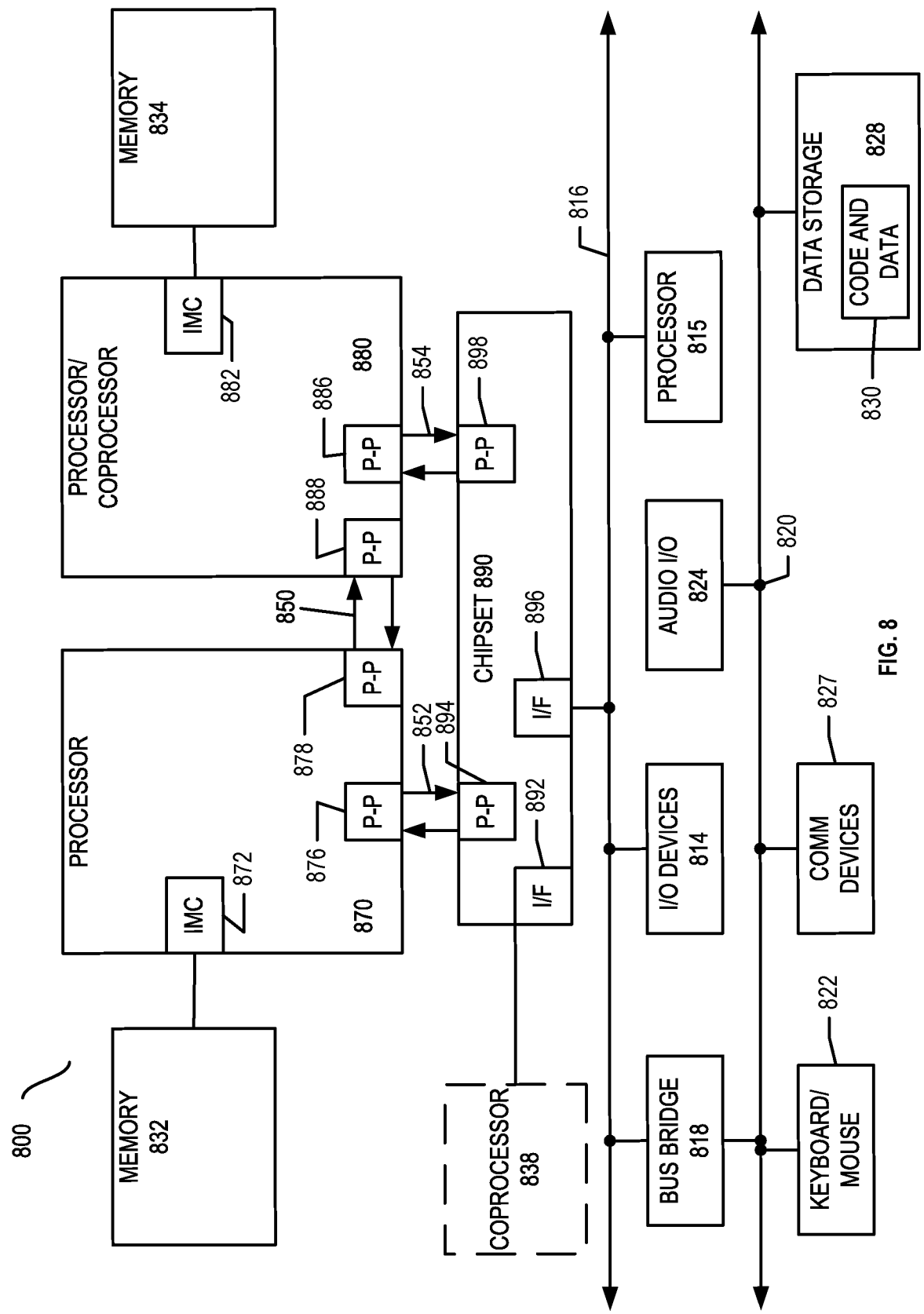
FIG. 8 illustrates a block diagram of a second system in accordance with an embodiment of the present invention.

Referring now to FIG. 8, shown is a block diagram of a first more specific exemplary system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment of the invention, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 892. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 816. Note that other architectures are possible. For example, instead of the point-to-point architecture of FIG. 8, a system may implement a multi-drop bus or other such architecture.

Figure 9:
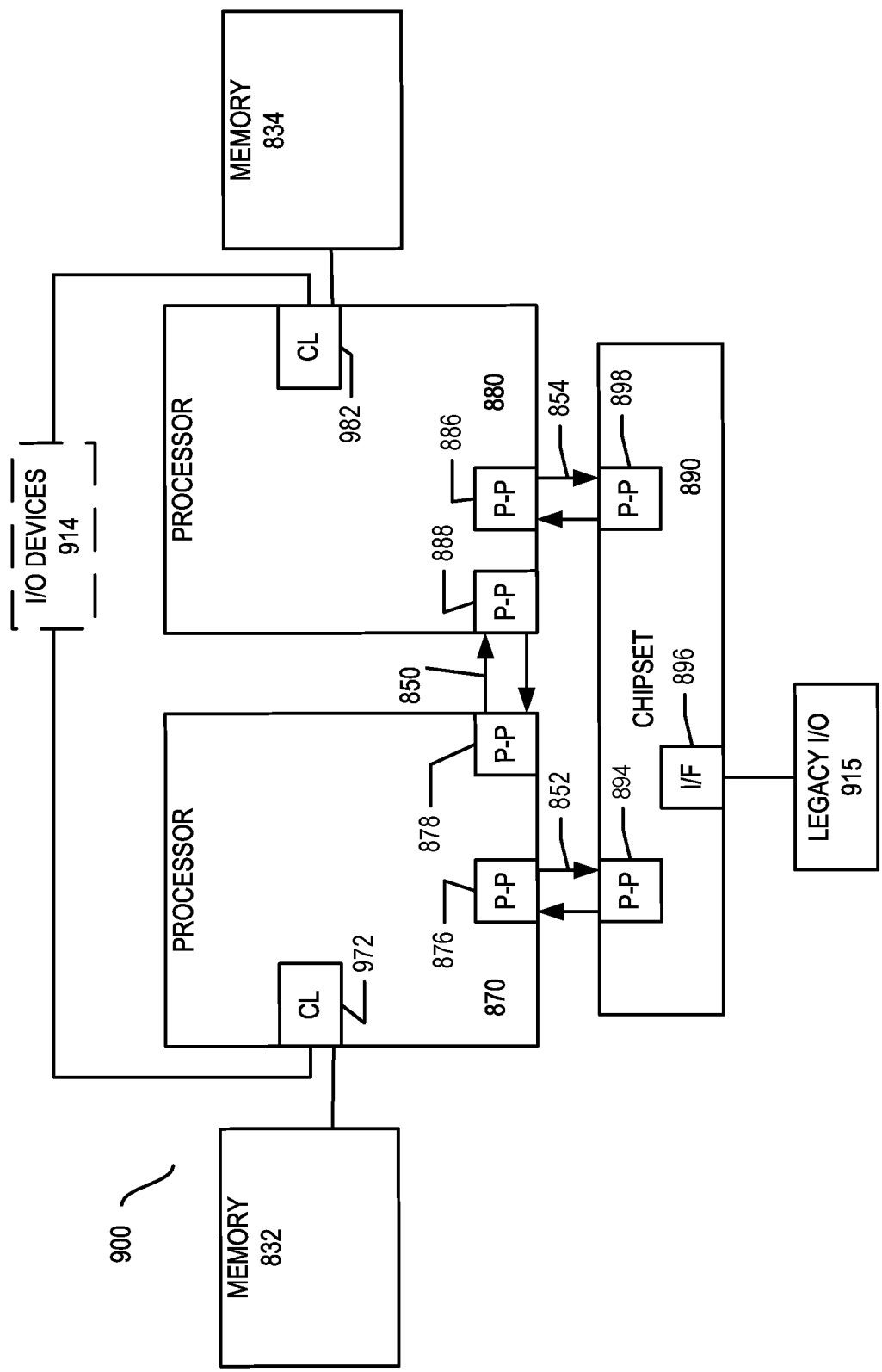
FIG. 9 illustrates a block diagram of a third system in accordance with an embodiment of the present invention.

Referring now to FIG. 9, shown is a block diagram of a second more specific exemplary system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 972 and 982, respectively. Thus, the CL 972, 982 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
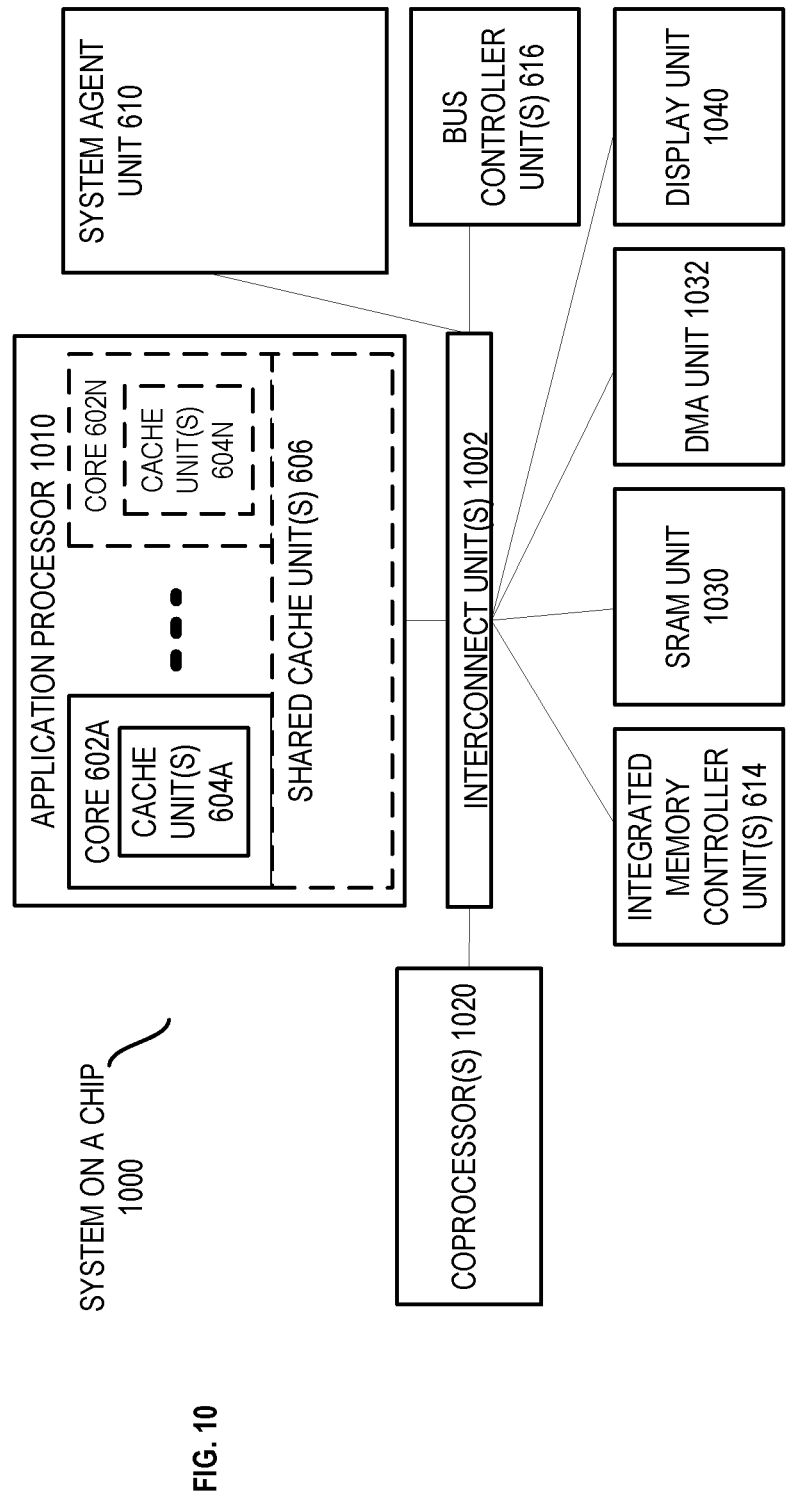
FIG. 10 illustrates a block diagram of a system on a chip (SoC) in accordance with an embodiment of the present invention.

Referring now to FIG. 10, shown is a block diagram of a SoC 1000 in accordance with an embodiment of the present invention. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 102A-N, cache units 604A-N, and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
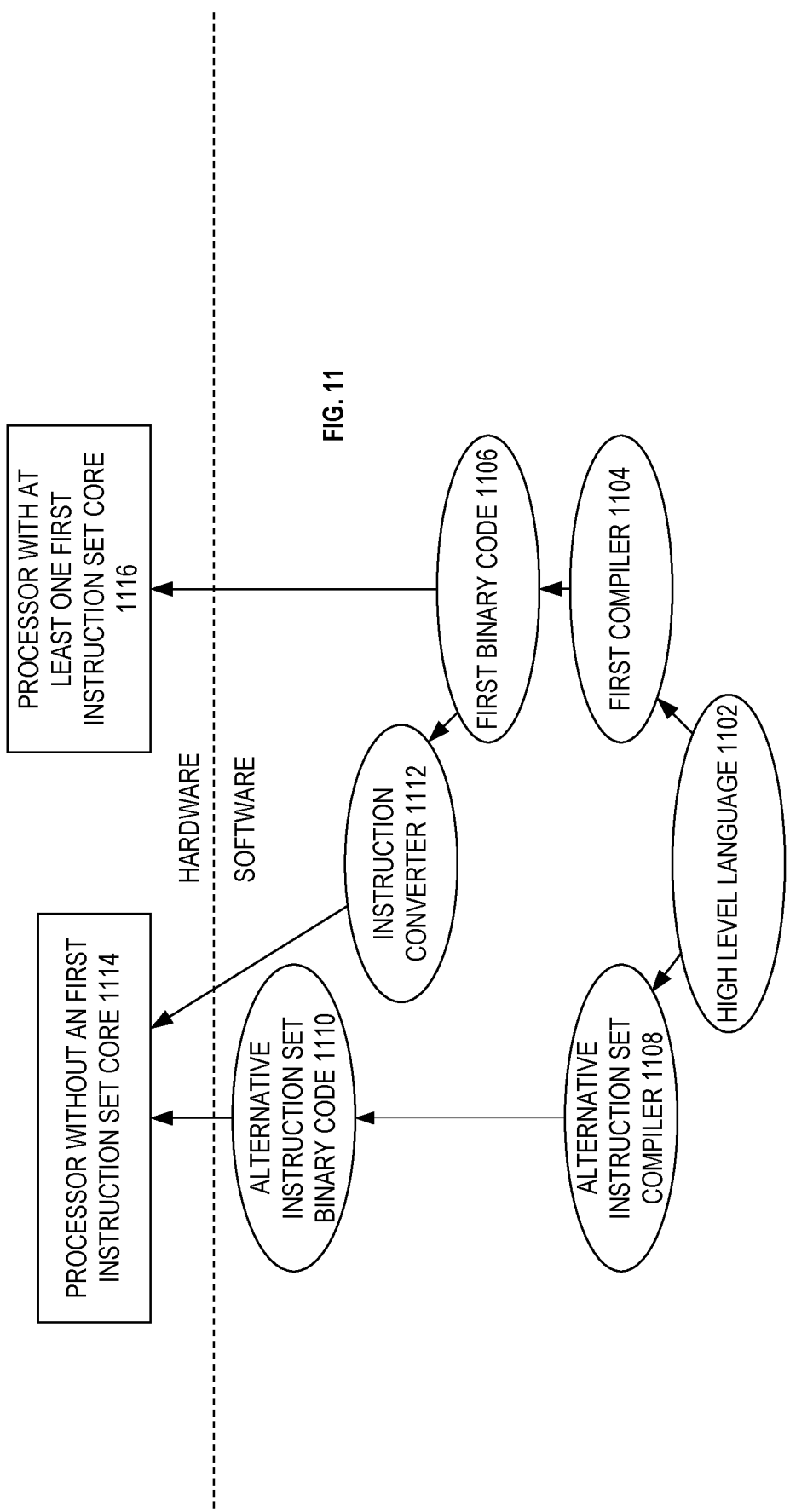
FIG. 11 illustrates a block diagram contrasting the use of a software instruction converter to convert binary instructions in a source instruction set to binary instructions in a target instruction set according to embodiments of the invention.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an first compiler 1104 to generate a first binary code (e.g., x86) 1106 that may be natively executed by a processor with at least one first instruction set core 1116. In some embodiments, the processor with at least one first instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 1104 represents a compiler that is operable to generate binary code of the first instruction set 1106 (e.g., object code) that can, with or without additional linkage processing, be executed on the processor with at least one first instruction set core 1116. Similarly, FIG. 11 shows the program in the high level language 1102 may be compiled using an alternative instruction set compiler 1108 to generate alternative instruction set binary code 1110 that may be natively executed by a processor without at least one first instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the first binary code 1106 into code that may be natively executed by the processor without an first instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have a first instruction set processor or core to execute the first binary code 1106.

Apparatus and Method for Digital Signal Processing Instructions

One embodiment of the invention includes circuitry and/or logic for processing digital signal processing (DSP) instructions. In particular, one embodiment comprises a multiply-accumulate (MAC) architecture with eight 16×16-bit multipliers and two 64-bit accumulators. The instruction set architecture (ISA) described below can process various multiply and MAC operations on 128-bit packed (8-bit, 16-bit or 32-bit data elements) integer, fixed point and complex data types. In addition, certain instructions have direct support for highly efficient Fast Fourier Transform (FFT) and Finite Impulse Response (FIR) filtering, and post-processing of accumulated data by shift, round, and saturate operations.

One embodiment of the new DSP instructions use a VEX.128 prefix based opcode encoding and several of the SSE/SSE2/AVX instructions that handle post-processing of data are used with the DSP ISA. The VEX-encoded 128-bit DSP instructions with memory operands may have relaxed memory alignment requirements.

In one embodiment, the instructions also support a variety of integer and fixed point data types including:
1) a Q31 data type for signals requiring analog to digital conversion (ADC) and digital to analog conversion (DAC) with greater than 16 bits;
2) a Q15 data type which is common in DSP algorithms;
3) a complex 16-bit data type; and
4) a complex 32-bit data type.

The instructions set architecture described herein targets a wide range of standard DSP (e.g., FFT, filtering, pattern matching, correlation, polynomial evaluation, etc) and statistical operations (e.g., mean, moving average, variance, etc.).

Target applications of the embodiments of the invention include sensor, audio, classification tasks for computer vision, and speech recognition. The DSP ISA described herein includes a wide range of instructions that are applicable to deep neural networks (DNN), automatic speech recognition (ASR), sensor fusion with Kalman filtering, other major DSP applications, etc. Given the sequence of weights $\{w_1, w_2, \ldots w_k\}$ and the input sequence $\{x_1, x_2, x_3, \ldots x_n\}$ many image processing, machine learning tasks require to compute the result sequence $\{y_1, y_2, y_3, \ldots y_{n+1-k}\}$ defined by $y_1 = w_1 x_1 + w_2 x_{1+1} + \ldots + w_k x_{1+k-1}$.

Figure 12:
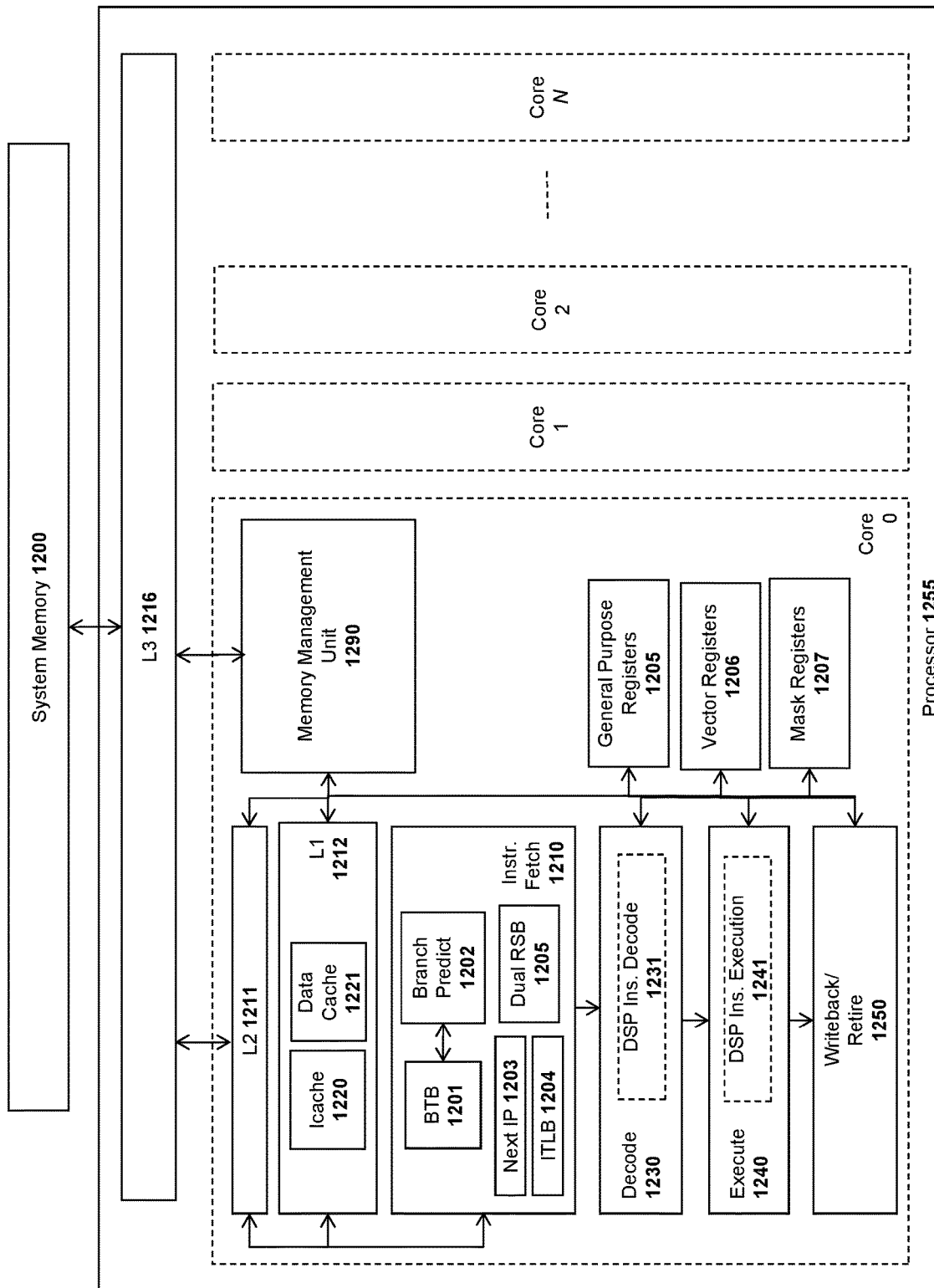
FIG. 12 illustrates a processor architecture on which embodiments of the invention may be implemented.

FIG. 12 illustrates an exemplary processor 1255 on which embodiments of the invention may be implemented which includes a plurality of cores 0-N for simultaneously executing a plurality of instruction threads. The illustrated embodiment includes DSP instruction decode circuitry/logic 1231 within the decoder 1230 and DSP instruction execution circuitry/logic 1341 within the execution unit 1240. These pipeline components may perform the operations described herein responsive to the decoding and execution of the DSP instructions.

While details of only a single core (Core 0) are shown in FIG. 12, it will be understood that each of the other cores of processor 1255 may include similar components. Prior to describing details of the embodiments of the invention, a description of the various components of the exemplary processor 1255 are provided directly below.

As mentioned, the exemplary embodiment includes a plurality of cores 0-N, each including a memory management unit 1290 for performing memory operations (e.g., such as load/store operations), a set of general purpose registers (GPRs) 1205, a set of vector registers 1206, and a set of mask registers 1207. In one embodiment, multiple vector data elements are packed into each vector register 1206 which may have a 512 bit width for storing two 256 bit values, four 128 bit values, eight 64 bit values, sixteen 32 bit values, etc. However, the underlying principles of the invention are not limited to any particular size/type of vector data. In one embodiment, the mask registers 1207 include eight 64-bit operand mask registers used for performing bit masking operations on the values stored in the vector registers 1206 (e.g., implemented as mask registers k0-k7 described herein). However, the underlying principles of the invention are not limited to any particular mask register size/type.

Each core 0-N may include a dedicated Level 1 (L1) cache 1212 and Level 2 (L2) cache 1211 for caching instructions and data according to a specified cache management policy. The L1 cache 1212 includes a separate instruction cache 1220 for storing instructions and a separate data cache 1221 for storing data. The instructions and data stored within the various processor caches are managed at the granularity of cache lines which may be a fixed size (e.g., 64, 128, 512 Bytes in length). Each core of this exemplary embodiment has an instruction fetch unit 1210 for fetching instructions from main memory 1200 and/or a shared Level 3 (L3) cache 1216. The instruction fetch unit 1210 includes various well known components including a next instruction pointer 1203 for storing the address of the next instruction to be fetched from memory 1200 (or one of the caches); an instruction translation look-aside buffer (ITLB) 1204 for storing a map of recently used virtual-to-physical instruction addresses to improve the speed of address translation; a branch prediction unit 1202 for speculatively predicting instruction branch addresses; and branch target buffers (BTBs) 1201 for storing branch addresses and target addresses.

As mentioned, a decode unit 1230 includes DSP instruction decode circuitry/logic 1231 for decoding the DSP instructions described herein into micro-operations or "uops" and the execution unit 1240 includes DSP instruction execution circuitry/logic 1241 for executing the DSP instructions. A writeback/retirement unit 1250 retires the executed instructions and writes back the results.

Complex-by-Complex Multiply and
Complex-by-Complex Conjugate Multiply of
Signed Words One embodiment of the invention includes a set of vector packed instructions that implement complex-by-complex multiply and complex-by-complex conjugate multiply of signed words stored in the lower 64-bits of source 1 and source 2 registers, referred to below as SRC1 and SRC2, respectively, or SRC2 and SRC3, respectively. Each of the complex numbers may be a doubleword (dword) and the real and imaginary components may each be signed words. In one embodiment, the real and imaginary components are added after the multiplication.

In the operation (16+16i)×(16+16i)+(16+16i)×(16+16i)*+(64+64i)=64+64i the order of the operands in one embodiment are SRC3(2)×SRC2(2)+SRC3(1)×SRC2(1) where SRC3(1) and SRC3(2) are the first and second complex numbers in the Source 3 register and SRC2(1) and SRC2(2) are the first and second complex numbers in the Source 2 register. As indicated by the above equation, the real and imaginary portions are added after the multiplication.

In one embodiment, before adding to the appropriate accumulator, each of the real and imaginary 34-bit signed results is sign extended and accumulated to the corresponding 64-bits of the real and imaginary values in the destination register. In one embodiment, the accumulated results of the real and imaginary components are saturated to 64-bits.

Figure 13:
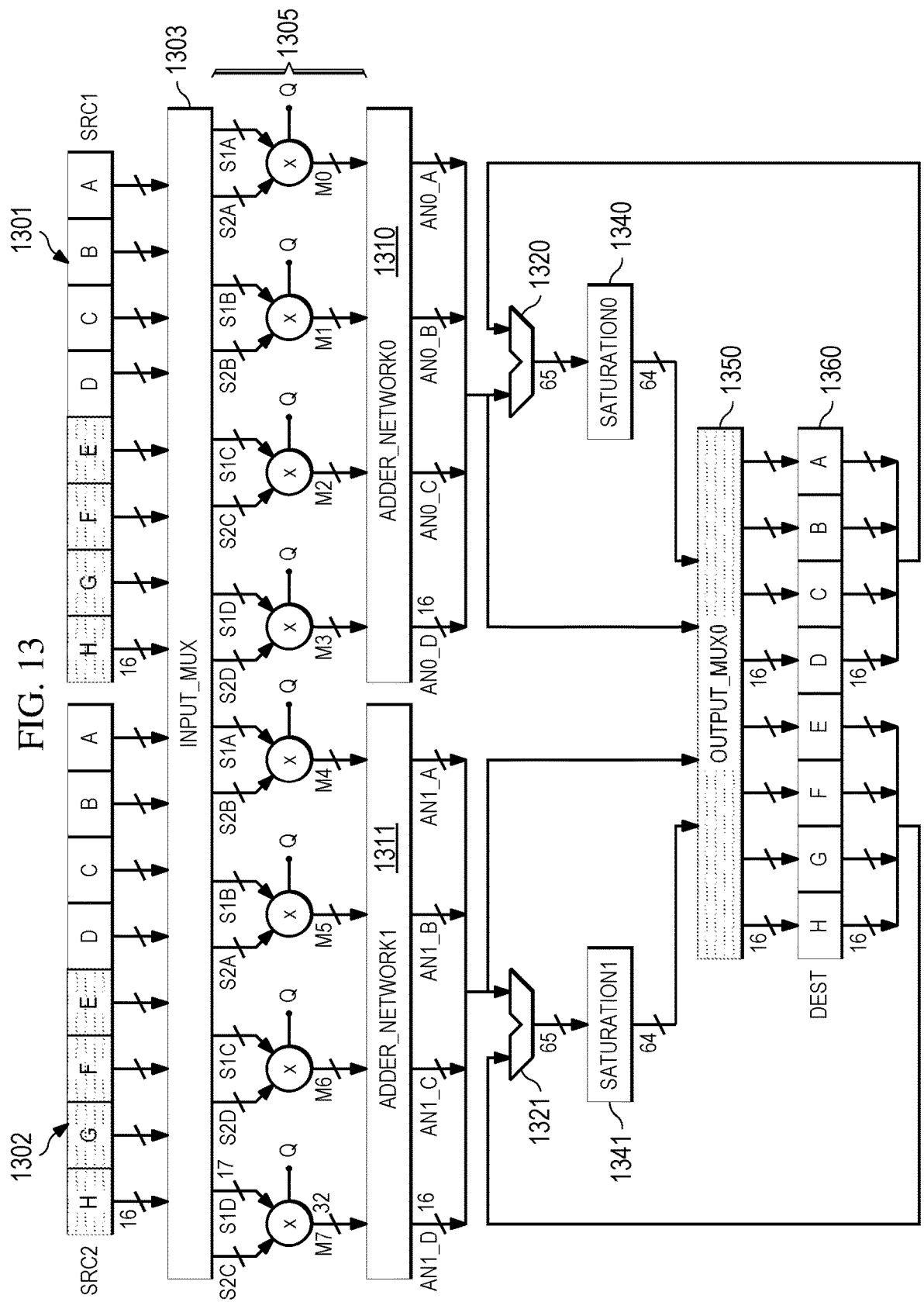
FIG. 13 illustrates an embodiment of circuitry/logic for performing multiply-accumulate operations on packed data elements with real and imaginary components.

One embodiment of the circuitry/logic for executing complex-complex multiply and complex-complex conjugate multiply is illustrated in FIG. 13. A first vector operand containing four data elements, A-D, is stored in the lower 64 bits of a first source register (SRC1) 1301 and a second vector operand containing four data elements, A-D, is stored in the lower 64 bits of a second source register (SRC2) 1302. While each data element is 16 bits in the illustrated example, the underlying principles of the invention are not limited to any particular data element sizes. For example, in another embodiment, vector data element sizes of 32 bits, 64 bits, 128 bits, etc, may be used.

An input MUX 1303 forwards the various data elements to a set of multipliers 1305 each of which multiplies a selected vector data element from SRC1 with a selected vector data element from SRC2. In one embodiment, the data elements are selected for multiplication in accordance with the equation SRC2(2)×SRC1(2)+SRC2(1)×SRC1(1), where SRC2(1), SRC2(2), SRC1(1), and SCR1(2) each represent a complex value comprising two vector data elements—one real and one imaginary. For example, SRC2 (1) includes data elements B and A which may be the real and imaginary components, respectively, of the complex number in SRC2(1). Similarly, SRC1(2) includes data elements D and C in SRC1 which may be the real and imaginary components, respectively, in SRC1(2).

The particular data elements selected for multiplication are indicated in FIG. 13. The notation "S1A" refers to data element A in SRC1 1301 and "S1B" refers to data element B in SRC1 1301. Other data elements are identified with consistent notation (e.g., "S2A" refers to data element A in SRC2, etc). Using this notation, the following multiplications are performed: S2C*S1D, S2D*S1C, S2A*S1B, S2B*S1A, S2D*S1D, S2C*S1C, S2B*S1B, and S2A*S1A.

A first and second set of adders within a first adder network 1310 and a second adder network 1311, then perform addition and subtraction operations to calculate the real and imaginary components of the result. In particular, adder network 1311 calculates the imaginary component which it stores in a temporary location (TEMP1) according to the equation:

TEMP1[33:0]←(((S1C*S2D)+(S1D*S2C))+
((S1A*S2A)−(S1B*S2A))).

Similarly, adder network 1310 calculates the real component which it stores in a temporary location (TEMP1) according to the equation:

TEMP0[33:0]←(((S1C*S2C)−(S1D*S2D))+
((S1A*S2A)+(S1B*S2B))).

Adder 1320 then combines the real component result the accumulated real values in data elements A-D in the lower 64 bits of the destination register 1360. Similarly, adder 1321 combines the imaginary result with the accumulated imaginary values in data elements E-H in the upper 64 bits of the destination register 1360.

In one embodiment, following accumulation by adders 1320-1321, the accumulated results are saturated by saturation circuitry 1340-1341 and output to the appropriate destination register location by output MUX 1350 as illustrated. As mentioned, the accumulated imaginary component is written to the upper 64-bits of the destination register 1360 (i.e., data elements E-H) and the accumulated real component is written to the lower 64-bits of destination register 1360 (i.e., data elements A-D).

The functionality implemented by these embodiments of the invention may be used in a number of processes that require the performance of complex by complex vector multiplication and accumulation of data. These instructions generate, accumulate, and saturate the real and imaginary parts of the complex output.

The proposed instructions implement multiply, add, accumulation, and saturation functionality on complex and complex conjugate data in the lower quadwords of vector source registers. Using existing instructions, this functionality requires a sequence of instructions to perform multiplication on the vector registers and perform 2-way addition to generate output. The result needs to be accumulated, and saturated before writing to the destination register. Instead, the embodiment described herein implements this functionality in one instruction.

The below pseudocode specifies one embodiment of the VPCCJMAACS231LW instructions:
    TEMP0[33:0] ← ((( (SRC2[47:32] * SRC3[47:32]) − (SRC2[63:48] * SRC3[63:48])) + ( (SRC2[15:0] * SRC3[15:0]) + (SRC2[31:16] * SRC3[31:16]) ) );
    (* Real Number *)
    TEMP1[33:0] ← ((( (SRC2[47:32] * SRC3[63:48]) + (SRC2[63:48] * SRC3[47:32]) ) + ( (SRC2[15:0] * SRC3[31:16]) − (SRC2[31:16] * SRC3[15:0]) ) );
    (* Imaginary Number *)
    DEST[63:0] ←
AddSaturateToSignedQuadword({{30TEMP0[33]}, TEMP0[33:0]}, DEST[63:0]);
    (* Real Number *)
    DEST[127:64] ←
AddSaturateToSignedQuadword({{30TEMP1[33]}, TEMP1[33:0]}, DEST[127:64]);
(* Imaginary Number *)
AddSaturateToSignedQuadword(SRC[63:0], DEST[63:0])
    TEMP[64:0] ← (SRC[63:0] + DEST[63:0]);
    IF (TEMP[64] == 1'b0) AND (TEMP[63] == 1'b1)
        DEST[63:0] ← 0x7FFF_FFFF_FFFF_FFFF; (* Most

```
        Positive Number *)
        MXCSR.Sat_Acc ← 1;
        MXCSR.Sat ← 1;
    ELSE IF (TEMP[64] == 1'b1) AND (TEMP[63] == 1'b0)
        DEST[63:0] ← 0x8000_0000_0000_0000; (* Most
        Negative Number *)
        MXCSR.Sat_Acc ← 1;
        MXCSR.Sat ← 1;
    ELSE
DEST[63:0] ← TEMP[63:0];
```

Figure 14:
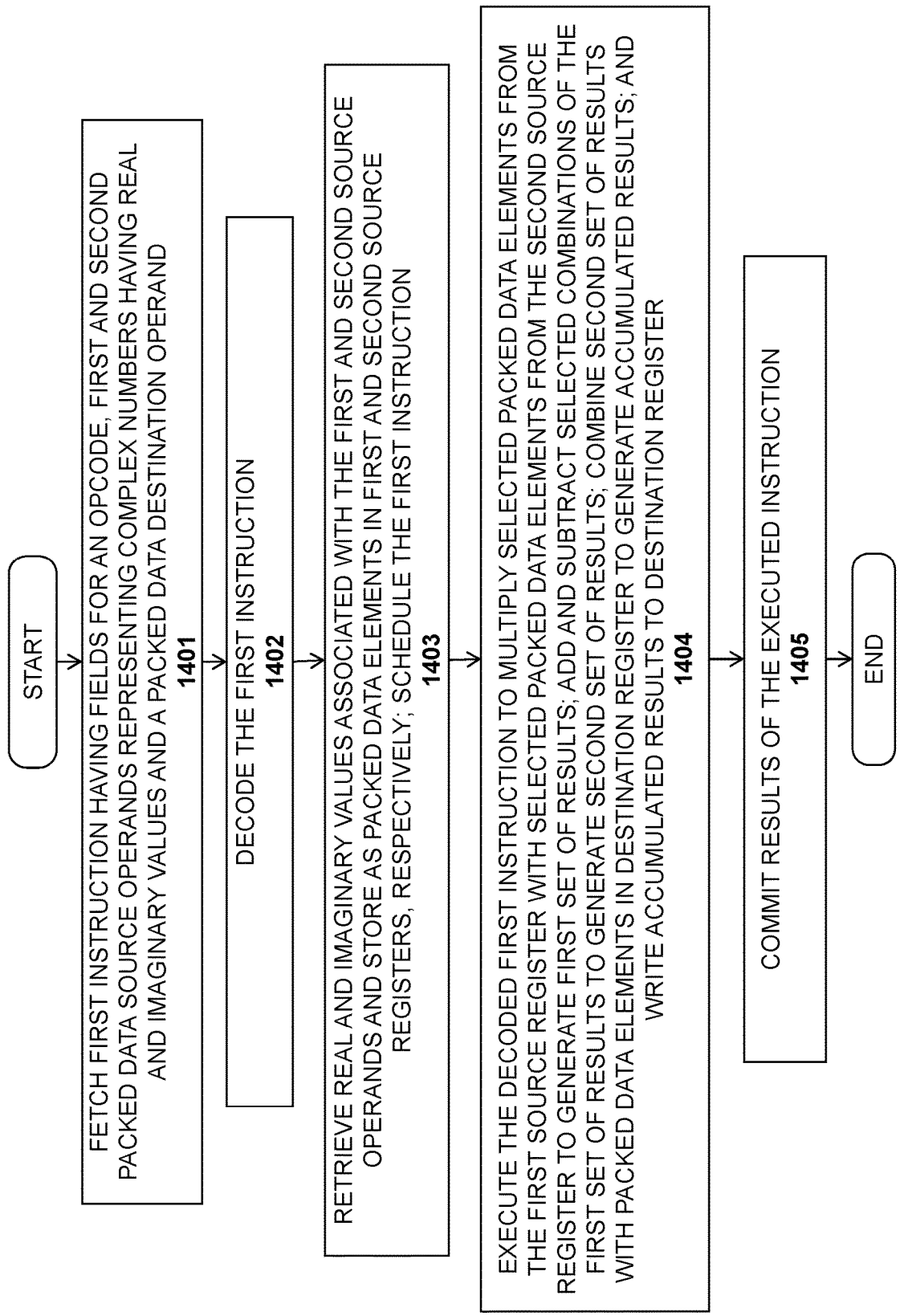
FIG. 14 illustrates a method in accordance with one embodiment of the invention.

A method in accordance with one embodiment is illustrated in FIG. 14. The method may be implemented within the context of the processor architectures described herein, but is not limited to any particular processor architecture.

At 1401 a first instruction is fetched having fields for an opcode and first and second packed data source operands representing complex numbers having real and imaginary values and a packed data destination operand. At 1402 the first instruction is decoded. At 1403, the real and imaginary values associated with the first and second source operands are stored as packed data elements in the first and second source registers and the first instruction is scheduled for execution.

At 1404 the first decoded instruction is executed to multiply the complex numbers by individually multiplying the real and imaginary values, accumulating the results (saturating if necessary), and writing the results to packed data elements in the destination register. The results are committed by the processor at 1405.

While the real and imaginary values described above are 16 bits in length, the underlying principles of the invention may be implemented using data element values of any size, limited only by the register sizes used in the processor. For example, the real and imaginary components may be 8-bits, 32-bits, or 64-bits while still complying with the underlying principles of the invention.

Vector Packed Multiply Unsigned Word and Accumulate

One embodiment of the invention comprises a set of vector instructions that implement multiplication of unsigned words in each of the lower and upper quadwords of the source registers SRC1 and SRC2. The 32-bit multiplication outputs are added and the result of the addition is accumulated with the destination register quadwords. The results are saturated and stored to the corresponding quadwords of the destination register. One embodiment of the instruction generates two 64-bit accumulator outputs each comprising multiple vector data elements. The functionality implemented by these instructions is useful in a number of algorithms that require performance of vector multiplication and accumulation of the vector register data to produce a 64-bit saturated result.

Figure 15:
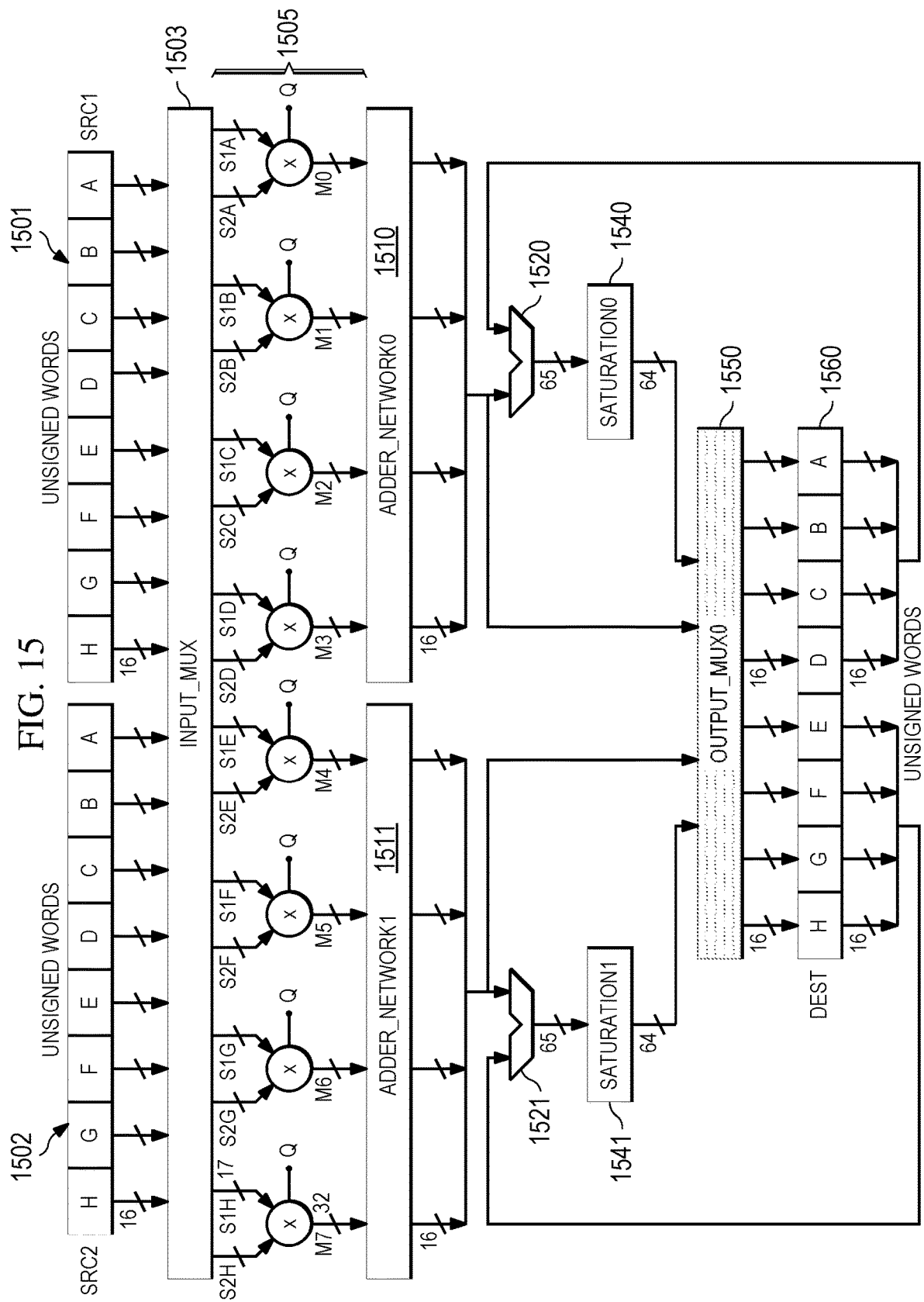
FIG. 15 illustrates an embodiment of circuitry/logic for performing multiply-accumulate operations on unsigned packed data elements.

Circuitry/logic for implementing one embodiment of the vector packed multiply and accumulate of unsigned words is illustrated in FIG. 15. A first set of 8 packed data elements S1A-S1H are stored in SRC1 1501 and a second set of 8 packed data elements S2A-S2H are stored in SRC2 1502. Input MUX 1503 forwards data elements to multipliers 1505 which, in one embodiment, multiply the data elements in the first source register 1501 by corresponding data elements in the second source register 1502, i.e., S1A*S2A, S1B*S2B, S1C*S2C, S1D*S2D, S1E*S2E, S1F*S2F, S1G*S2G, and S1H*S2H.

The results are added by adder networks 1510-1511 as illustrated. In particular, in one embodiment, a first adder network 1510 performs the addition operations S1A*S2A+S1B*S2B+S1C*S2C+S1D*S2D the result of which is stored in a first temporary storage location (e.g., TEMP0 in the pseudocode below). A second adder network 1511 performs the addition operations S1E*S2E+S1F*S2F+S1G*S2G+S1H*S2H the result of which is stored in a second temporary storage location (e.g., TEMP1 in the pseudocode below). The results are then combined with corresponding data elements stored in the destination register 1560, with adder 1520 combining data elements from the first temporary register (TEMP0) with elements A-D in the destination register 1560 and adder 1521 combining data elements from the second temporary register (TEMP1) with elements E-H in the destination register 1560.

Saturation circuitry/logic 1540-1541 saturates the results if necessary and output MUX 1550 stores the final data elements A-H to the destination register 1560. One or more additional iterations may be performed using new source values and destination register values.

The below pseudocode specifies the operation of one embodiment of the VPMAACS231U W instructions:

```
    TEMP0[33:0] ← ((SRC2[63:48] * SRC3[63:48]) +
(SRC2[47:32] * SRC3[47:32]) + (SRC2[31:16] * SRC3[31:16]) +
(SRC2[15:0] * SRC3[15:0]));
    TEMP1[33:0] ← ((SRC2[127:112] * SRC3[127:112]) +
(SRC2[111:96] * SRC3[111:96]) + (SRC2[95:80] * SRC3[95:80]) +
(SRC2[79:64] * SRC3[79:64]));
    DEST[63:0] ← AddSaturateToUnSignedQuadword({30'b0,
TEMP0[33:0]}, DEST[63:0]);
    DEST[127:64] ← AddSaturateToUnSignedQuadword({30'b0,
TEMP1[33:0]}, DEST[127:64]);
    AddSaturateToUnSignedQuadword(SRC[63:0], DEST[63:0])
    TEMP[64:0] ← (SRC[63:0] + DEST[63:0]);
    IF (TEMP[64] == 1'b1)
        DEST[63:0] ← 0xFFFF_FFFF_FFFF_FFFF; (* Most
        Positive Number *)
        MXCSR.Sat_Acc ← 1;
        MXCSR.Sat ← 1;
    ELSE
        DEST[63:0] ← TEMP[63:0].
```

According to the above code, if bit TEMP[64]=1, this means that the result needs to be saturated because the value has surpassed the maximum available value. As such, the result is saturated, setting DEST[63:0] to the most positive number. Otherwise the destination is written with the temporary accumulated value: DEST[63:0]←TEMP[63:0].

Figure 16:
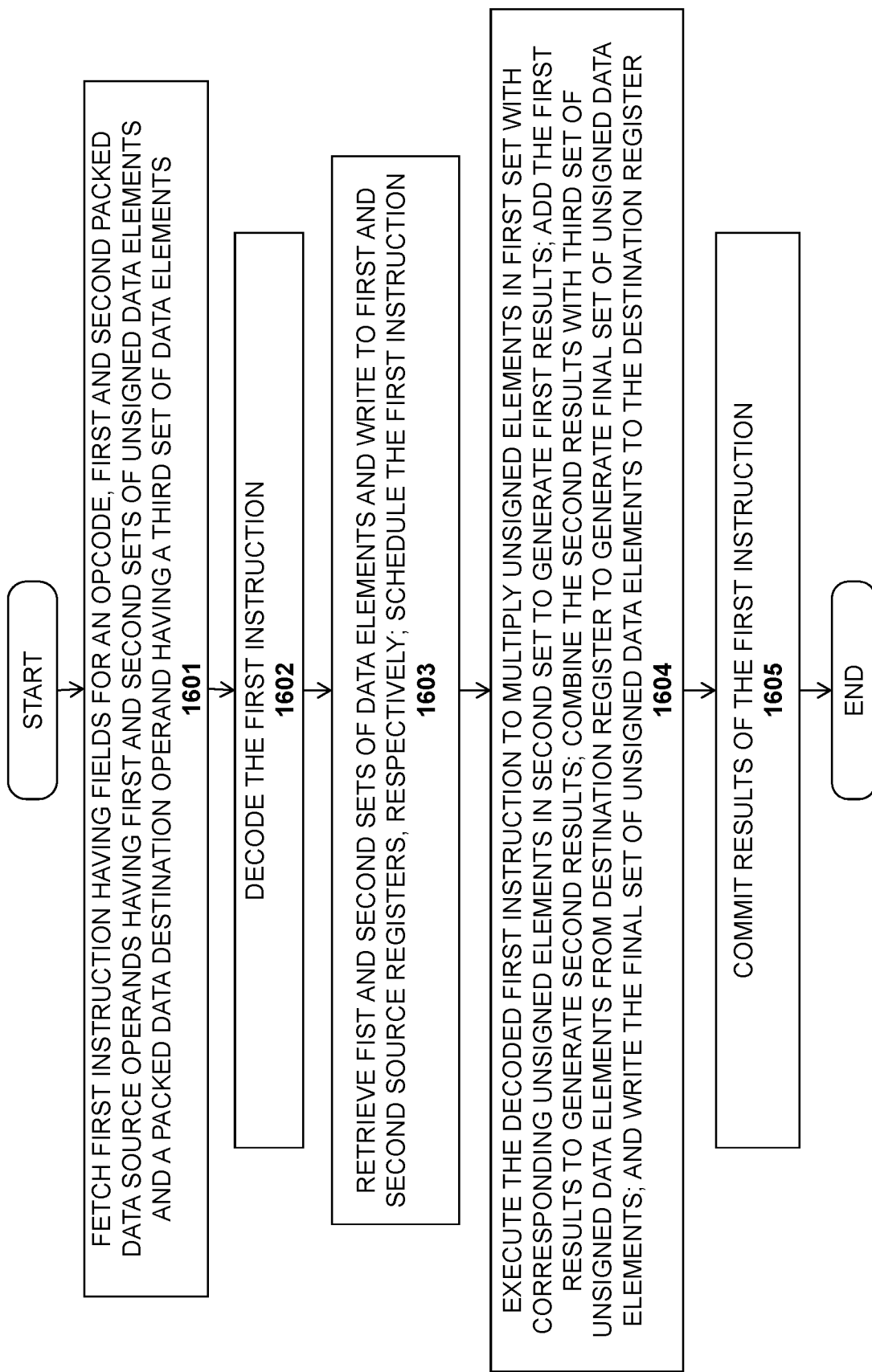
FIG. 16 illustrates a method in accordance with one embodiment of the invention.

A method in accordance with one embodiment is illustrated in FIG. 16. The method may be implemented within the context of the processor architectures described herein, but is not limited to any particular processor architecture.

At 1601, a first instruction is fetched having fields for an opcode, first and second packed data source operands having first and second sets of unsigned data elements, and a packed data destination operand having a third set of data elements.

At 1602, the first instruction is decoded. In one embodiment, decoding generates a plurality of microoperations to be executed by subsequent stages of the processor.

At 1603 the first and second sets of data elements are retrieved and written to the first and second source registers, respectively. For example, in an embodiment which multiplies unsigned data elements, the unsigned packed data elements are written to specified locations within the first and second source registers.

At 1604, the decoded first instruction is executed to multiply the unsigned data elements in the first set with corresponding unsigned data elements in the second set to generate first results. The first results are then added to generate second results, which are combined with a third set of unsigned packed data elements from the destination register to generate a final set of unsigned packed data elements. The final set of unsigned packed data elements are then written to the destination register.

At 1605, the results of the first instruction are committed to the processor's architectural state.

While the packed unsigned data elements described above are packed words, the underlying principles of the invention may be implemented using data element values of any size, limited only by the register sizes used in the processor. For example, the data element values may be 8-bits, 16-bits, 32-bits, or 64-bits while still complying with the underlying principles of the invention.

Vector Packed Multiply Signed Word and Accumulate

One embodiment of the invention comprises a set of vector packed instructions which implement multiplication of signed words in each of the lower, upper quadwords of source registers. The 32-bit multiply outputs are added and the result of the addition is accumulated with the destination register quadwords. The results are then stored to the quadwords of the destination register.

The functionality implemented by these embodiments is useful in a number of algorithms that require performance of signed vector multiplication and accumulation of the vector register data to produce a 64-bit saturated result. One embodiment of the vector packed instruction generates two 64-bit saturated accumulator outputs.

Using existing instructions, this functionality requires a sequence of instructions to perform multiplication on the vector register, perform 4-way addition and accumulation with the destination quadword data, and saturate to generate the two 64-bit results. Instead, one embodiment of the invention implements this functionality in one instruction.

Figure 17:
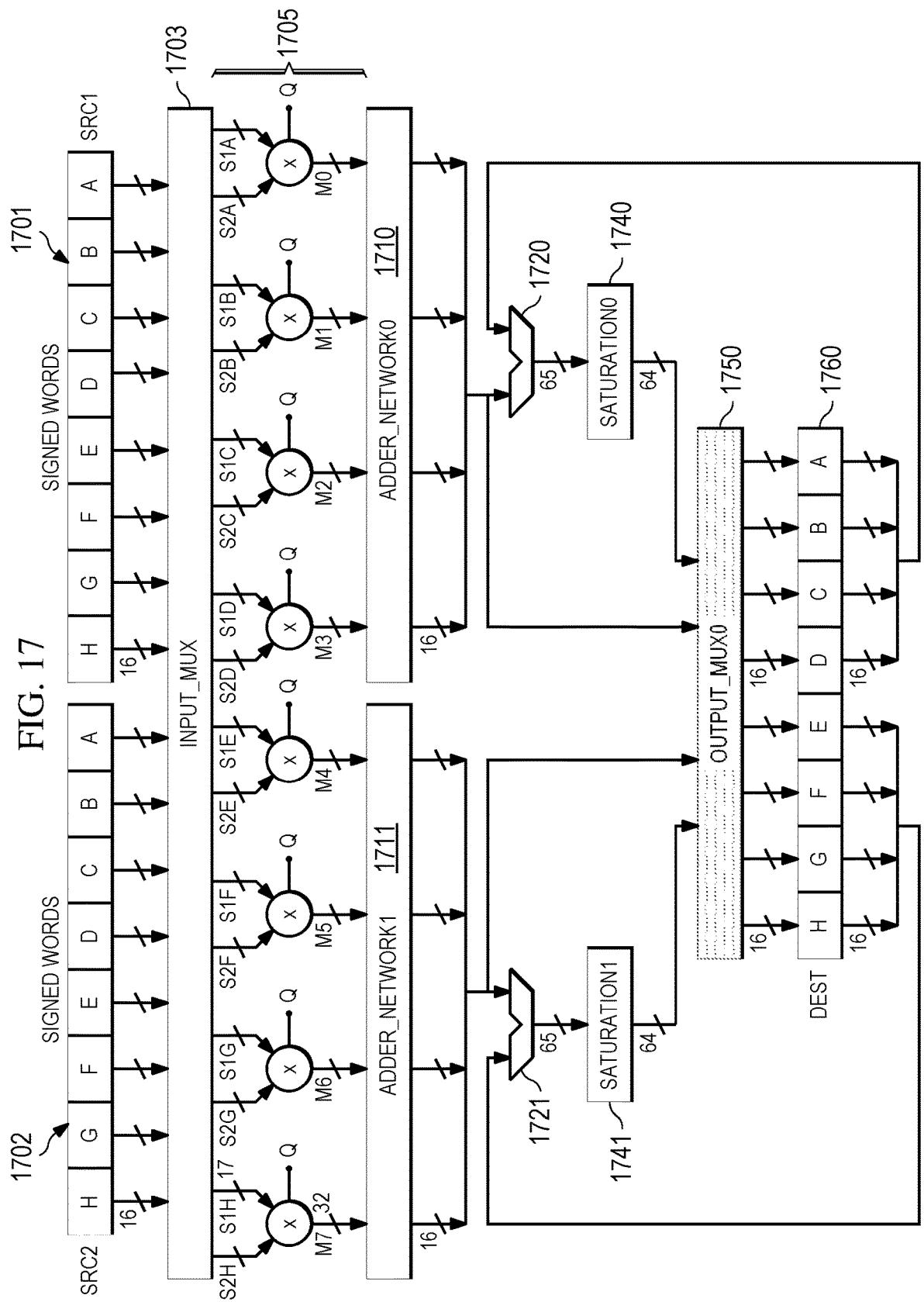
FIG. 17 illustrates an embodiment of circuitry/logic for performing multiply-accumulate operations on signed packed data elements.

FIG. 17 illustrates circuitry/logic for implementing one embodiment of the packed multiply and accumulate operation on signed words. A first set of eight signed word vector data elements S1A-S1H are stored in SRC1 1701 and a second set of eight signed word vector data elements S2A-S2H are stored in SRC2 1702. Input MUX 1703 forwards the signed word data elements to multipliers 1705 which multiply the data elements in the first source register 1701 by corresponding data elements in the second source register 1702, i.e., S1A*S2A, S1B*S2B, S1C*S2C, S1D*S2D, S1E*S2E, S1F*S2F, S1 G*S2G, and S1H*S2H.

The results are added as shown by adder networks 1710-1711. In particular, in one embodiment, adder network 1710 performs the addition operations S1A*S2A+S1B*S2B+S1C*S2C+S1D*S2D, the result of which is stored in a first temporary storage location (e.g., TEMP0 in the pseudocode below). Similarly, adder network 1711 performs the addition operations S1E*S2E+S1F*S2F+S1G*S2G+S1H*S2H, the result of which is stored in a second temporary storage location (e.g., TEMP1 in the pseudocode below). The results are then combined with corresponding signed word data elements stored in the destination register 1760, with adder 1720 combining data elements from the first temporary register (TEMP0) with packed signed word data elements A-D in the destination register 1760 and adder 1721 combining data elements from the second temporary register (TEMP1) with packed signed data element elements E-H in the destination register 1760.

Saturation circuitry/logic 1740-1741 saturates the results (if necessary) and output MUX 1750 stores the final data elements A-H to the destination register 1760. One or more additional iterations may be performed using new source values and destination register values.

The figure below provides the pseudocode for an embodiment of the VPMAACS231W instructions:

```
TEMP0[33:0] ← ((SRC2[63:48] * SRC3[63:48]) +
(SRC2[47:32] * SRC3[47:32]) + (SRC2[31:16] * SRC3[31:16]) +
(SRC2[15:0] * SRC3[15:0]));
    TEMP1[33:0] ← ((SRC2[127:112] * SRC3[127:112]) +
(SRC2[111:96] * SRC3[111:96]) + (SRC2[95:80] * SRC3[95:80]) +
(SRC2[79:64] * SRC3[79:64]));
    DEST[63:0] ←
    AddSaturateToSignedQuadword({{30{TEMP0[33]}}
TEMP0[33:0]}, DEST[63:0]);
    DEST[127:64] ←
    AddSaturateToSignedQuadword({{30{TEMP1[33]}},
TEMP1[33:0]}, DEST[127:64]);
    AddSaturateToSignedQuadword(SRC[63:0], DEST[63:0])
        TEMP[64:0] ← (SRC[63:0] + DEST[63:0]);
        IF (TEMP[64] == 1'b0) AND (TEMP[63] == 1'b1)
            DEST[63:0] ← 0x7FFF_FFFF_FFFF_FFFF;
            (* Most Positive Number *)
            MXCSR.Sat_Acc ← 1;
            MXCSR.Sat ← 1;
        ELSE IF (TEMP[64] == 1'b1) AND (TEMP[63] == 1'b0)
            DEST[63:0] ← 0x8000_0000_0000_0000; (* Most
            Negative Number *)
            MXCSR.Sat_Acc ← 1;
            MXCSR.Sat ← 1;
        ELSE
    DEST[63:0] ← TEMP[63:0].
```

According to the above code, if bit TEMP[64]=0 and TEMP[63]=1, this means that the result needs to be positively saturated because the value has surpassed the maximum positive value. If TEMP[64]=1 AND TEMP[63]=0, this indicates that the value needs to be negatively saturated because the value has surpassed the maximum negative value. As such, the result is saturated either positively or negatively, setting DEST[63:0] to the maximum positive or minimum negative number, respectively. Otherwise the destination is written with the temporary accumulated value: DEST[63:0]←TEMP[63:0].

Figure 18:
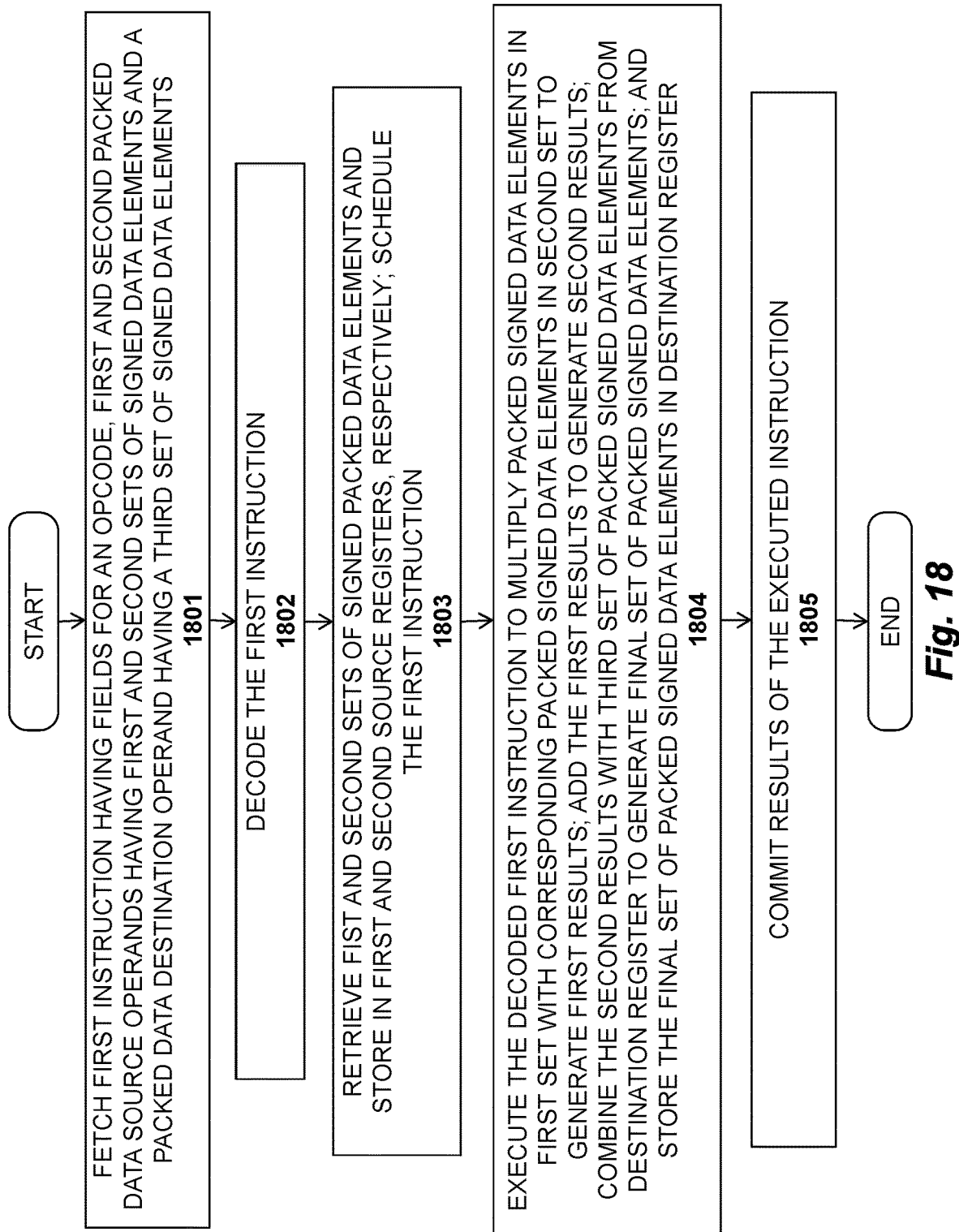
FIG. 18 illustrates a method in accordance with one embodiment of the invention.

A method in accordance with one embodiment is illustrated in FIG. 18. The method may be implemented within the context of the processor architectures described herein, but is not limited to any particular processor architecture.

At 1801, a first instruction is fetched having fields for an opcode, first and second packed data source operands having first and second sets of signed data elements, and a packed data destination operand having a third set of data elements.

At 1802, the first instruction is decoded. In one embodiment, decoding generates a plurality of microoperations to be executed by subsequent stages of the processor.

At 1803 the first and second sets of data elements are retrieved and written to the first and second source registers, respectively. For example, in an embodiment which multiplies signed data elements, the signed packed data elements are written to specified locations within the first and second source registers.

At 1804, the decoded first instruction is executed to multiply the signed data elements in the first set with corresponding signed data elements in the second set to generate first results. The first results are then added to generate second results, which are combined with a third set of signed packed data elements from the destination register to generate a final set of signed packed data elements. The final set of signed packed data elements are then written to the destination register.

At 1805, the results of the first instruction are committed to the processor's architectural state.

While the packed signed data elements described above are packed signed words, the underlying principles of the invention may be implemented using data element values of any size, limited only by the register sizes used in the processor. For example, the data element values may be 8-bits, 16-bits, 32-bits, or 64-bits while still complying with the underlying principles of the invention.

Exemplary Embodiments of the Invention

One embodiment comprises a processor comprising: a decoder to decode a first instruction to generate a decoded instruction; a first source register to store a first plurality of packed unsigned words; a second source register to store a second plurality of packed unsigned words; execution circuitry to execute the decoded instruction, the execution circuitry comprising: multiplier circuitry to multiply each of a plurality of packed unsigned words from the first source register with corresponding packed unsigned words from the second source register to generate a plurality of products responsive to the decoded instruction, adder circuitry to add the products to generate a first result, and accumulation circuitry to combine the first result with an accumulated result to generate a final result comprising a third plurality of packed unsigned words, and to write the third plurality of packed unsigned words or a maximum value to a destination register.

One embodiment comprises the above processor wherein the accumulated result is read from the destination register, the accumulated result comprising a fourth plurality of packed unsigned words.

One embodiment comprises the above processor wherein the multiplier circuitry is to perform the multiplications S1A*S2A, S1B*S2B, S1C*S2C, S1D*S2D, S1E*S2E, S1F*S2F, S1G*S2G, and S1H*S2H, to generate the plurality of products, where S1 identifies the first source register, S2 identifies the second source register and A-H identify the packed unsigned words within the first and second source registers, ordered from lowest to highest data element positions in the first and second source registers.

One embodiment comprises the above processor wherein the accumulation circuitry further comprises: saturation circuitry to write the maximum value in the destination register responsive to detecting that a value of the third plurality of packed unsigned words are above a threshold.

One embodiment comprises the above processor wherein the saturation circuitry is to initially store the final result in a temporary storage having a storage size one bit larger than a designated portion of the destination register, the saturation circuitry to detect that the value of the third plurality of packed unsigned words are above the threshold by detecting that one bit in a bit position greater than the threshold is set to 1.

One embodiment comprises the above processor further comprising: instruction fetch circuitry to fetch the first instruction from a system memory or cache.

One embodiment comprises the above processor wherein the accumulation circuitry comprises one or more accumulation adders to add the first result with the accumulated result to generate the final result.

One embodiment comprises the above processor wherein the decoded instruction comprises a plurality of microoperations to be individually executed by the execution circuitry.

One embodiment comprises a method comprising: decoding a first instruction to generate a decoded instruction; storing a first plurality of packed unsigned words in a first source register; storing a second plurality of packed unsigned words in a second source register; executing the decoded instruction and responsively performing a plurality of operations including: multiplying each of a plurality of packed unsigned words from the first source register with corresponding packed unsigned words from the second source register to generate a plurality of products responsive to the decoded instruction; adding the products to generate a first result; and combining the first result with an accumulated result to generate a final result comprising a third plurality of packed unsigned words, and writing the third plurality of packed unsigned words or a maximum value to a destination register.

One embodiment comprises the above method wherein the accumulated result is read from the destination register, the accumulated result comprising a fourth plurality of packed unsigned words.

One embodiment comprises the above method wherein multiplying further comprises performing the multiplications S1A*S2A, S1B*S2B, S1C*S2C, S1D*S2D, S1E*S2E, S1F*S2F, S1G*S2G, and S1H*S2H, to generate the plurality of products, where S1 identifies the first source register, S2 identifies the second source register and A-H identify the packed unsigned words within the first and second source registers, ordered from lowest to highest data element positions in the first and second source registers.

One embodiment comprises the above method further comprising: writing the maximum value to the destination register responsive to detecting that a value of the third plurality of packed unsigned words are above a threshold.

One embodiment comprises the above method further comprising: initially storing the final result in a temporary storage having a storage size one bit larger than a designated portion of the destination register; and detecting that the value of the third plurality of packed unsigned words are above the threshold by detecting that one bit in a bit position greater than the threshold is set to 1.

One embodiment comprises the above method further comprising: fetching the first instruction from a system memory or cache.

One embodiment comprises the above method wherein adding is performed by one or more accumulation adders to add the first result with the accumulated result to generate the final result.

One embodiment comprises a machine-readable medium having program code stored thereon which, when executed by a machine, causes the machine to perform the operations of: decoding a first instruction to generate a decoded instruction; storing a first plurality of packed unsigned words in a first source register; storing a second plurality of packed unsigned words in a second source register; executing the decoded instruction and responsively performing a plurality of operations including: multiplying each of a plurality of packed unsigned words from the first source register with corresponding packed unsigned words from the second source register to generate a plurality of products responsive to the decoded instruction; adding the products to generate a first result; and combining the first result with an accumulated result to generate a final result comprising a third plurality of packed unsigned words, and writing the third plurality of packed unsigned words or a maximum value to a destination register.

One embodiment comprises the above machine-readable medium wherein the accumulated result is read from the destination register, the accumulated result comprising a fourth plurality of packed unsigned words.

One embodiment comprises the above machine-readable medium wherein multiplying further comprises performing the multiplications S1A*S2A, S1B*S2B, S1C*S2C, S1D*S2D, S1E*S2E, S1F*S2F, S1G*S2G, and S1H*S2H, to generate the plurality of products, where S1 identifies the first source register, S2 identifies the second source register and A-H identify the packed unsigned words within the first and second source registers, ordered from lowest to highest data element positions in the first and second source registers.

One embodiment comprises the above machine-readable medium further comprising: writing the maximum value to the destination register responsive to detecting that a value of the third plurality of packed unsigned words are above a threshold.

One embodiment comprises the above machine-readable medium further comprising: initially storing the final result in a temporary storage having a storage size one bit larger than a designated portion of the destination register; and detecting that the value of the third plurality of packed unsigned words are above the threshold by detecting that one bit in a bit position greater than the threshold is set to 1.

One embodiment comprises the above machine-readable medium further comprising: fetching the first instruction from a system memory or cache.

One embodiment comprises the above machine-readable medium wherein adding is performed by one or more accumulation adders to add the first result with the accumulated result to generate the final result.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
a decoder to decode a first instruction to generate a decoded instruction;
a first source register to store a first plurality of packed unsigned words;
a second source register to store a second plurality of packed unsigned words;
execution circuitry to execute the decoded instruction, the execution circuitry comprising:
multiplier circuitry to multiply each of a plurality of packed unsigned words from the first source register with corresponding packed unsigned words from the second source register to generate a plurality of products responsive to the decoded instruction,
adder circuitry to add a first subset of the products to generate a first result and to add a second subset of the products to generate a second result; and
accumulation circuitry to combine the first result with a first accumulated result to generate a first final result comprising a third plurality of packed unsigned words, and to combine the second result with a second accumulated result to generate a second final result comprising a fourth plurality of packed unsigned words, the accumulation circuitry further to write the third plurality of packed unsigned words or a maximum value to a first quadword position in a destination register and to write the fourth plurality of packed unsigned words or the maximum value to a second quadword position in the destination register.

2. The processor of claim 1 wherein the first and second accumulated results are read from the destination register, the first and second accumulated results comprising a fifth and a sixth plurality of packed unsigned words, respectively.

3. The processor of claim 2 wherein the multiplier circuitry is to perform the multiplications S1A*S2A, S1B*S2B, S1C*S2C, S1D*S2D, S1E*S2E, S1F*S2F, S1G*S2G, and S1H*S2H, to generate the plurality of products, where S1 identifies the first source register, S2 identifies the second source register and A-H identify the packed unsigned words within the first and second source registers, ordered from lowest to highest data element positions in the first and second source registers.

4. The processor of claim 1 wherein the accumulation circuitry further comprises:
saturation circuitry to write the maximum value in the first quadword position of the destination register responsive to detecting that a value of the third plurality of packed unsigned words is above a threshold, the saturation circuitry further to write the maximum value in the second quadword position of the destination register responsive to detecting that a value of the fourth plurality of packed unsigned words is above the threshold.

5. The processor of claim 4 wherein the saturation circuitry is to initially store the first or the second final result in a temporary storage having a storage size one bit larger than a designated portion of the destination register, the saturation circuitry to detect that the value of the third or the fourth plurality of packed unsigned words are above the threshold by detecting that one bit in a bit position greater than the threshold is set to 1.

6. The processor of claim 1 further comprising:
instruction fetch circuitry to fetch the first instruction from a system memory or cache.

7. The processor of claim 1 wherein the accumulation circuitry comprises one or more accumulation adders to add the first result with the first accumulated result to generate the first final result and to add the second result with the second accumulated result to generate the second final result.

8. The processor of claim 1 wherein the decoded instruction comprises a plurality of microoperations to be individually executed by the execution circuitry.

9. A method comprising:
decoding a first instruction to generate a decoded instruction;
storing a first plurality of packed unsigned words in a first source register;
storing a second plurality of packed unsigned words in a second source register;
executing the decoded instruction and responsively performing a plurality of operations including:
multiplying each of a plurality of packed unsigned words from the first source register with corresponding packed unsigned words from the second source register to generate a plurality of products responsive to the decoded instruction;
adding a first subset of the products to generate a first result;
adding a second subset of the products to generate a second result;
combining the first result with a first accumulated result to generate a first final result comprising a third plurality of packed unsigned words;
combining the second result with a second accumulated result to generate a second final result comprising a fourth plurality of packed unsigned words;
writing the third plurality of packed unsigned words or a maximum value to a first quadword position of a destination register; and
writing the fourth plurality of packed unsigned words or the maximum value to a second quadword position of the destination register.

10. The method of claim 9 wherein the first and second accumulated results are read from the destination register, the first and second accumulated results comprising a fifth and a sixth plurality of packed unsigned words, respectively.

11. The method of claim 10 wherein multiplying further comprises performing the multiplications S1A*S2A, S1B*S2B, S1C*S2C, S1D*S2D, S1E*S2E, S1F*S2F, S1G*S2G, and S1H*S2H, to generate the plurality of products, where S1 identifies the first source register, S2 identifies the second source register and A-H identify the packed unsigned words within the first and second source registers, ordered from lowest to highest data element positions in the first and second source registers.

12. The method of claim 9 further comprising:
writing the maximum value to the first quadword position of the destination register responsive to detecting that a value of the third plurality of packed unsigned words is above a threshold; and
writing the maximum value to the second quadword position of the destination register responsive to detecting that a value of the fourth plurality of packed unsigned words is above the threshold.

13. The method of claim 12 further comprising:
initially storing the first or the second final result in a temporary storage having a storage size one bit larger than a designated portion of the destination register; and
detecting that the value of the third or the fourth plurality of packed unsigned words are above the threshold by detecting that one bit in a bit position greater than the threshold is set to 1.

14. The method of claim 9 further comprising:
fetching the first instruction from a system memory or cache.

15. The method of claim 9 wherein adding is performed by one or more accumulation adders to add the first result with the first accumulated result to generate the first final result and to add the second result with the second accumulated result to generate the second final result.

16. A machine-readable medium having program code stored thereon which, when executed by a machine, causes the machine to perform the operations of:
decoding a first instruction to generate a decoded instruction;
storing a first plurality of packed unsigned words in a first source register;
storing a second plurality of packed unsigned words in a second source register;
executing the decoded instruction and responsively performing a plurality of operations including:
multiplying each of a plurality of packed unsigned words from the first source register with corresponding packed unsigned words from the second source register to generate a plurality of products responsive to the decoded instruction;
adding a first subset of the products to generate a first result;
adding a second subset of the products to generate a second result;
combining the first result with a first accumulated result to generate a first final result comprising a third plurality of packed unsigned words;

combining the second result with a second accumulated result to generate a second final result comprising a fourth plurality of packed unsigned words;

writing the third plurality of packed unsigned words or a maximum value to a first quadword position of a destination register; and writing the fourth plurality of packed unsigned words or the maximum value to a second quadword position of the destination register.

17. The machine-readable medium of claim 16 wherein the first and second accumulated results are read from the destination register, the first and second accumulated results comprising a fifth and a sixth plurality of packed unsigned words, respectively.

18. The machine-readable medium of claim 17 wherein multiplying further comprises performing the multiplications S1A*S2A, S1B*S2B, S1C*S2C, S1D*S2D, S1E*S2E, S1F*S2F, S1G*S2G, and S1H*S2H, to generate the plurality of products, where S1 identifies the first source register, S2 identifies the second source register and A-H identify the packed unsigned words within the first and second source registers, ordered from lowest to highest data element positions in the first and second source registers.

19. The machine-readable medium of claim 16, wherein the operations further comprise:

writing the maximum value to the first quadword position of the destination register responsive to detecting that a value of the third plurality of packed unsigned words is above a threshold; and writing the maximum value to the second quadword position of the destination register responsive to detecting that a value of the fourth plurality of packed unsigned words is above the threshold.

20. The machine-readable medium of claim 19, wherein the operations further comprise:

initially storing the first or the second final result in a temporary storage having a storage size one bit larger than a designated portion of the destination register; and detecting that the value of the third or the fourth plurality of packed unsigned words are above the threshold by detecting that one bit in a bit position greater than the threshold is set to 1.

21. The machine-readable medium of claim 16 further comprising:

fetching the first instruction from a system memory or cache.

22. The machine-readable medium of claim 16 wherein adding is performed by one or more accumulation adders to add the first result with the first accumulated result to generate the first final result and to add the second result with the second accumulated result to generate the second final result.

* * * * *